United States Patent
Nozaki et al.

(10) Patent No.: US 8,330,714 B2
(45) Date of Patent: Dec. 11, 2012

(54) ELECTRONIC DEVICE

(75) Inventors: Hirotake Nozaki, Port Washington, NY (US); Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 357 days.

(21) Appl. No.: 11/658,769

(22) PCT Filed: Oct. 3, 2005

(86) PCT No.: PCT/JP2005/018268
§ 371 (c)(1),
(2), (4) Date: Apr. 27, 2007

(87) PCT Pub. No.: WO2006/038577
PCT Pub. Date: Apr. 13, 2006

(65) Prior Publication Data
US 2008/0001916 A1    Jan. 3, 2008

(51) Int. Cl.
*G09G 5/00* (2006.01)
(52) U.S. Cl. ............ 345/156; 345/173; 345/175
(58) Field of Classification Search .......... 345/156, 345/173, 175
See application file for complete search history.

(56) References Cited

U.S. PATENT DOCUMENTS

| | | | |
|---|---|---|---|
| 5,025,314 A * | 6/1991 | Tang et al. | 348/14.08 |
| 5,325,146 A * | 6/1994 | Toji | 396/81 |
| 5,528,263 A * | 6/1996 | Platzker et al. | 345/156 |
| 6,050,690 A * | 4/2000 | Shaffer et al. | 353/122 |
| 6,176,782 B1 * | 1/2001 | Lyons et al. | 463/36 |
| 6,346,933 B1 | 2/2002 | Lin | |
| 2001/0012001 A1 * | 8/2001 | Rekimoto et al. | 345/173 |
| 2004/0141162 A1 * | 7/2004 | Olbrich | 353/119 |
| 2005/0024322 A1 * | 2/2005 | Kupka | 345/156 |
| 2006/0010400 A1 * | 1/2006 | Dehlin et al. | 715/856 |
| 2008/0030459 A1 * | 2/2008 | Kouno | 345/156 |

FOREIGN PATENT DOCUMENTS

| | | |
|---|---|---|
| JP | A-07-129322 | 5/1995 |
| JP | A-09-062444 | 3/1997 |
| JP | A 9-274132 | 10/1997 |
| JP | A-09-512656 | 12/1997 |
| JP | A-11-345087 | 12/1999 |
| JP | A 2000-298544 | 10/2000 |
| JP | A-2001-125738 | 5/2001 |
| JP | A-2003-076495 | 3/2003 |
| JP | A-2005-141151 | 6/2005 |
| WO | WO 95/34881 | 12/1995 |

OTHER PUBLICATIONS

Dec. 28, 2010 Supplementary European Search Report for European Patent Application No. 05788088.2.

* cited by examiner

*Primary Examiner* — Amare Mengistu
*Assistant Examiner* — Koosha Sharifi-Tafreshi
(74) *Attorney, Agent, or Firm* — Oliff & Berridge, PLC

(57) ABSTRACT

The electronic device includes a projector device that projects an image formed by an optical image formation element, an imaging device that captures an image of an object to be photographed so that an imaging range includes the range of projection by the projector device and outputs an image signal, an image change detection unit that detects change of the image signal after having excluded the projection range from the range photographed by the imaging device, and a command unit that issues a command related to operation of the projector device according to the region within the imaging range in which change has been detected by the image change detection unit.

21 Claims, 12 Drawing Sheets

FIG. 5

| DETECTION BLOCK \ PROJECTION CONTENTS | IMAGE REPLAY | SLIDE SHOW | TV IMAGE | VIDEO REPLAY | MENU | WORKSHEET |
|---|---|---|---|---|---|---|
| "LEFT" | PREVIOUS IMAGE | PREVIOUS IMAGE | PREVIOUS CHANNEL | FAST REVERSE | CURSOR TO LEFT | SCROLL LEFT |
| "RIGHT" | NEXT IMAGE | NEXT IMAGE | NEXT CHANNEL | FAST FORWARD | CURSOR TO RIGHT | SCROLL RIGHT |
| "UP" | VOLUME UP | VOLUME UP | VOLUME UP | VOLUME UP | CURSOR UP | SCROLL UP |
| "DOWN" | VOLUME DOWN | VOLUME DOWN | VOLUME DOWN | VOLUME DOWN | CURSOR DOWN | SCROLL DOWN |
| "LEFT→RIGHT" | TEN FRAMES FAST FORWARD | TEN FRAMES FAST FORWARD | LAST CHANNEL | FAST FORWARD TO END | SCROLL LEFT | NEXT PAGE |
| "RIGHT→LEFT" | TEN FRAMES FAST REVERSE | TEN FRAMES FAST REVERSE | FIRST CHANNEL | RETURN TO START | SCROLL RIGHT | PREVIOUS PAGE |
| "UP→DOWN" | NEXT FOLDER | NEXT FOLDER | AUDIO SIGNAL DOWN | NEXT FOLDER | SCROLL UP | FINAL PAGE |
| "DOWN→UP" | PREVIOUS FOLDER | PREVIOUS FOLDER | AUDIO SIGNAL UP | PREVIOUS FOLDER | SCROLL DOWN | FIRST PAGE |
| "ALL OF UP, DOWN, LEFT, AND RIGHT" | STOP REPLAY | PAUSE / RESTART | TV OFF | PAUSE /RESTART | CONFIRM | END |

FIG.6
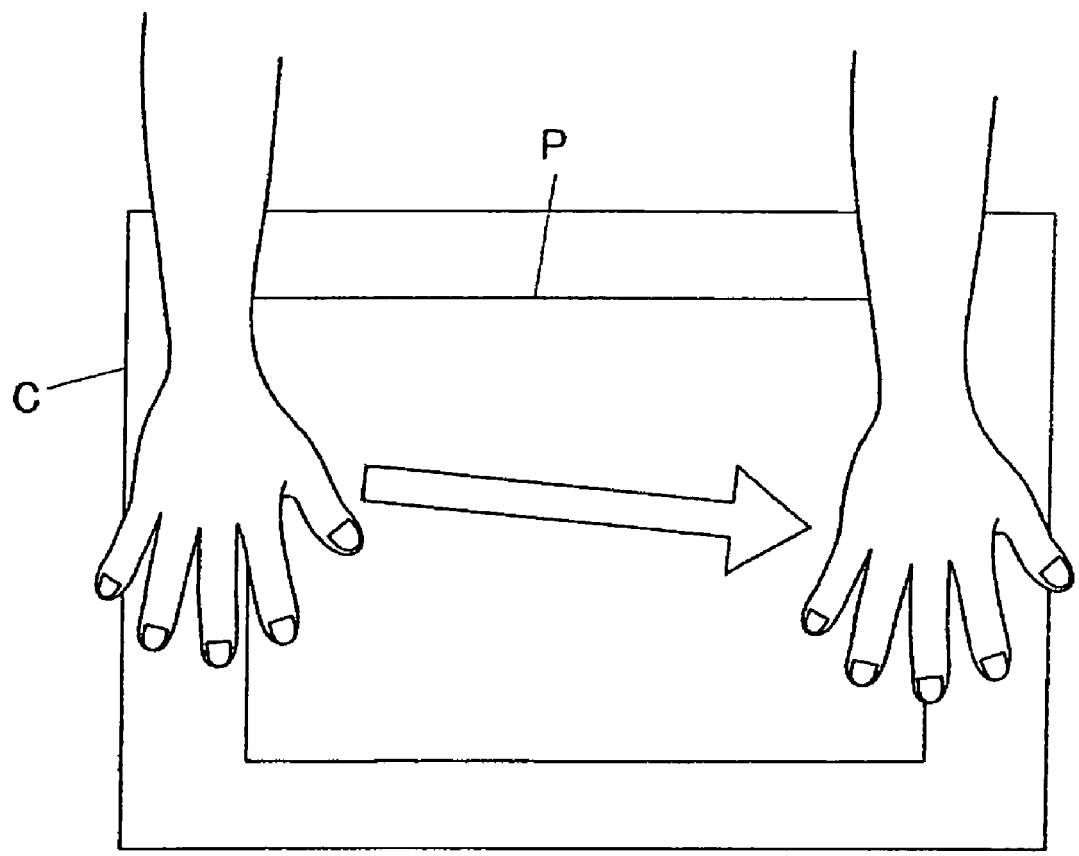
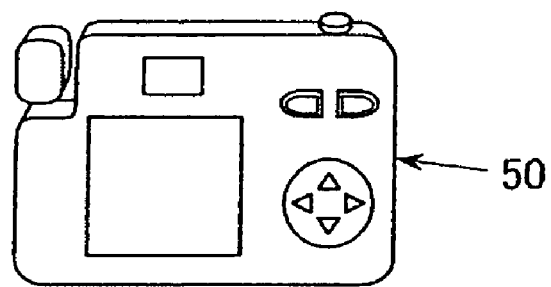

ELECTRONIC DEVICE

TECHNICAL FIELD

The present invention relates to an electronic device with a projector device that projects information such as an image or text or the like.

BACKGROUND ART

A presentation system is known (refer to Patent Document #1) in which a user issues commands to a projector device which projects a picture or the like upon a screen or the like for proceeding from the current projection contents to the next picture, drawing underlining under projection contents, zooming projection contents and the like, from a position which is away from the projector device. In the Patent Document #1, there is disclosed a technique in which a laser beam is projected by a laser pointer upon a presentation picture, the presentation picture which is being projected and the laser spot are photographed at a frame rate of 10 frames per second using an electronic camera, and the commands are specified based upon the movement and the position of the laser spot which are obtained based upon the pictures which have been photographed.
Patent Document #1: Japanese Laid-Open Patent Publication 2001-125738

DISCLOSURE OF THE INVENTION

Problems to be Solved by the Invention

With the technique described in the Patent Document #1, it is necessary to identify a geometric pattern such as an arrow sign, a box or the like formed by the trajectory of the laser spot, so that it is necessary to perform complicated analysis processing.

Means for Solving the Problems

According to a first aspect of the present invention, an electronic device includes a projector device that projects an image formed by an optical image formation element, an imaging device that captures an image of an object to be photographed so that an imaging range includes a range of projection by the projector device and outputs an image signal, an image change detection unit that detects change of the image signal in a range determined by excluding the projection range from an imaging range photographed by the imaging device, and a command unit that issues a command related to operation of an external device which is electrically connected to the projector device and the electronic device according to the region within the imaging range in which change has been detected by the image change detection unit.

According to a second aspect of the present invention, an electronic device according to the first aspect may also include a reception unit that receives an external signal outputted by the external device which is electrically connected to the electronic device. And it is desirable, the command unit decides whether or not the command based upon the change is valid according to whether or not the external signal is being received via the reception unit if change of the image signal has been detected by the image change detection unit.

According to a third aspect of the present invention, with an electronic device according to the second aspect, it is desirable for the image change detection unit to detect change of the image signal in at least one of predetermined regions which are provided at an upper, a lower, a left and a right portion within the imaging range and predetermined regions which are positioned in four corner portions of the imaging range, and for the command unit to issue the command which is determined in advance for each of the predetermined regions.

According to a fourth aspect of the present invention, with an electronic device according to the third aspect, it is desirable for the command unit to issue the command if the change of the image signal detected by the image change detection unit has continued for a predetermined time period.

According to a fifth aspect of the present invention, with an electronic device according to the third or the fourth aspect, it is desirable for the image change detection unit to make the region for detection of change of the image signal be different according to contents being projected by the projector device.

According to a sixth aspect of the present invention, with an electronic device according to the third or the fourth aspect, it is desirable, when change of the image signal has been detected by the image change detection unit in the same predetermined region, the command unit makes the command be different according to contents being projected by the projector device.

According to a seventh aspect of the present invention, in an electronic device according to the first aspect, it is desirable to further incorporate a control unit that causes the projector device to project information which indicates a correspondence between the command by the command unit and the region in which change is detected by the image change detection unit.

According to an eighth aspect of the present invention, in an electronic device according to the first aspect thereof, it is desirable to further incorporate a display device that displays information which indicates a correspondence between the command by the command unit and the region in which change is detected by the picture change detection unit.

According to a ninth aspect of the present invention, an electronic device includes an imaging device that captures an image of an object to be photographed and outputs a picture signal, a projector device that projects an image formed by an optical image formation element, a focus evaluation information calculation unit which calculates focus evaluation information based upon the image signal, a focus evaluation information change detection unit that detects change of focus evaluation information calculated by the focus evaluation information calculation unit, and a command unit that issues a command related to the operation of the projector device according to the region within the range of photography by the imaging device in which change of the focus evaluation information has been detected.

According to a tenth aspect of the present invention, with an electronic device according to the ninth aspect, it is desirable for the range of photography by the imaging device to be approximately equal to the range of projection by the projection device or to include the projection range.

According to an eleventh aspect of the present invention, with an electronic device according to the tenth aspect, it is desirable for the focus evaluation information calculation unit to calculate the focus evaluation information in at least one of predetermined regions which are positioned at the upper, lower, left and right portions within the imaging range and predetermined regions which are positioned at the four corner portions of the imaging range, and for the command unit to issue the command which is determined in advance for each the predetermined region.

According to a twelfth aspect of the present invention, with an electronic device according to the eleventh aspect, it is desirable for the command unit to command the contents of the commands if the change of the focus evaluation information which has been detected by the focus evaluation information change detection unit has continued for a predetermined time period.

According to a thirteenth aspect of the present invention, with an electronic device according to the eleventh or the twelfth aspect, it is desirable for the focus evaluation information calculation unit to change a region in which the focus evaluation information is calculated according to contents being projected by the projector device.

According to a fourteenth aspect of the present invention, with an electronic device according to the eleventh or the twelfth aspect, it is desirable for the command unit to change a command to be issued according to contents being projected by the projector device when change of the focus evaluation information has been detected by the focus evaluation information change detection unit in the same predetermined region.

According to a fifteenth aspect of the present invention, with an electronic device according to the ninth aspect, it is desirable to be further included a control unit that causes the projector device to project information indicating a correspondence between the command by the command unit and the region in which change is detected by the focus evaluation information change detection unit.

According to a sixteenth aspect of the present invention, with an electronic device according to the ninth aspect, it is desirable to be further included a display device that displays information indicating a correspondence between the command by the command unit and the region in which change is detected by the focus evaluation information change detection unit.

According to a seventeenth aspect of the present invention, an electronic device includes a projector device that projects an image formed by an optical image formation element, an imaging device that captures an image of an object to be photographed and outputs an image signal, an image change detection unit that detects change of the image signal outputted from the imaging device, a focus evaluation information calculation unit that acquires focus evaluation information, a focus evaluation information change detection unit that detects change of focus evaluation information calculated by the focus evaluation information acquisition unit, a first command unit that issues a command related to operation of the projector device based upon change of the image signal, a second command unit that issues a command related to the operation of the projector device based upon change of the focus evaluation information, and a control unit that controls the first command unit and the second command unit to issue the command from one of the first command unit and the second command unit according to contents being projected by the projector device.

It would also be acceptable to replace the above described image change detection unit by an image change detection means.

It would also be acceptable to replace the above described command unit by a command means.

It would also be acceptable to replace the above described control unit by a control means.

It would also be acceptable to replace the above described focus evaluation information calculation unit by a focus evaluation information calculation means.

It would also be acceptable to replace the above described focus evaluation information change detection unit by a focus evaluation information change detection means.

It would also be acceptable to replace the above described image change detection unit by an image change detection means.

It would also be acceptable to replace the above described focus evaluation information acquisition unit by a focus evaluation information acquisition means.

It would also be acceptable to replace the above described first command unit by a first command means.

It would also be acceptable to replace the above described second command unit by a second command means.

Advantageous Effect of the Invention

Since the present invention has a structure as explained above, it provides the following types of beneficial effects. With the electronic device with a projector device according to the present invention, with a simple structure, it is possible to issue commands related to the operation of the projector device from a position which is remote from the electronic device.

Furthermore, according to another aspect of the present invention, with a simple structure, it is possible to issue commands related to the operation of the projector device from a position which is remote from the electronic device.

Moreover, according to another aspect of the present invention, with an electronic device which includes an imaging device and a projector device, since, according to the projection contents, it is arranged either to issue commands for operation related to the projector device based upon change of the image signal which has been photographed, or to issue such commands based upon change of the focus evaluation information, accordingly, even if projection contents which is changing is being projected such as a moving image, it is possible to issue commands from a position removed from the electronic device in an appropriate manner.

BRIEF DESCRIPTION OF THE DRAWINGS

FIG. 5 is a figure for explanation of a command table;

FIG. 6 is a figure for explanation of a case in which a hand held in a space corresponding to a block is shifted to a space which corresponds to another block;

BEST MODE FOR CARRYING OUT THE INVENTION

Preferred embodiments for implementing the present invention will now be explained in the following with reference to the drawings.

First Embodiment

Figure 1:
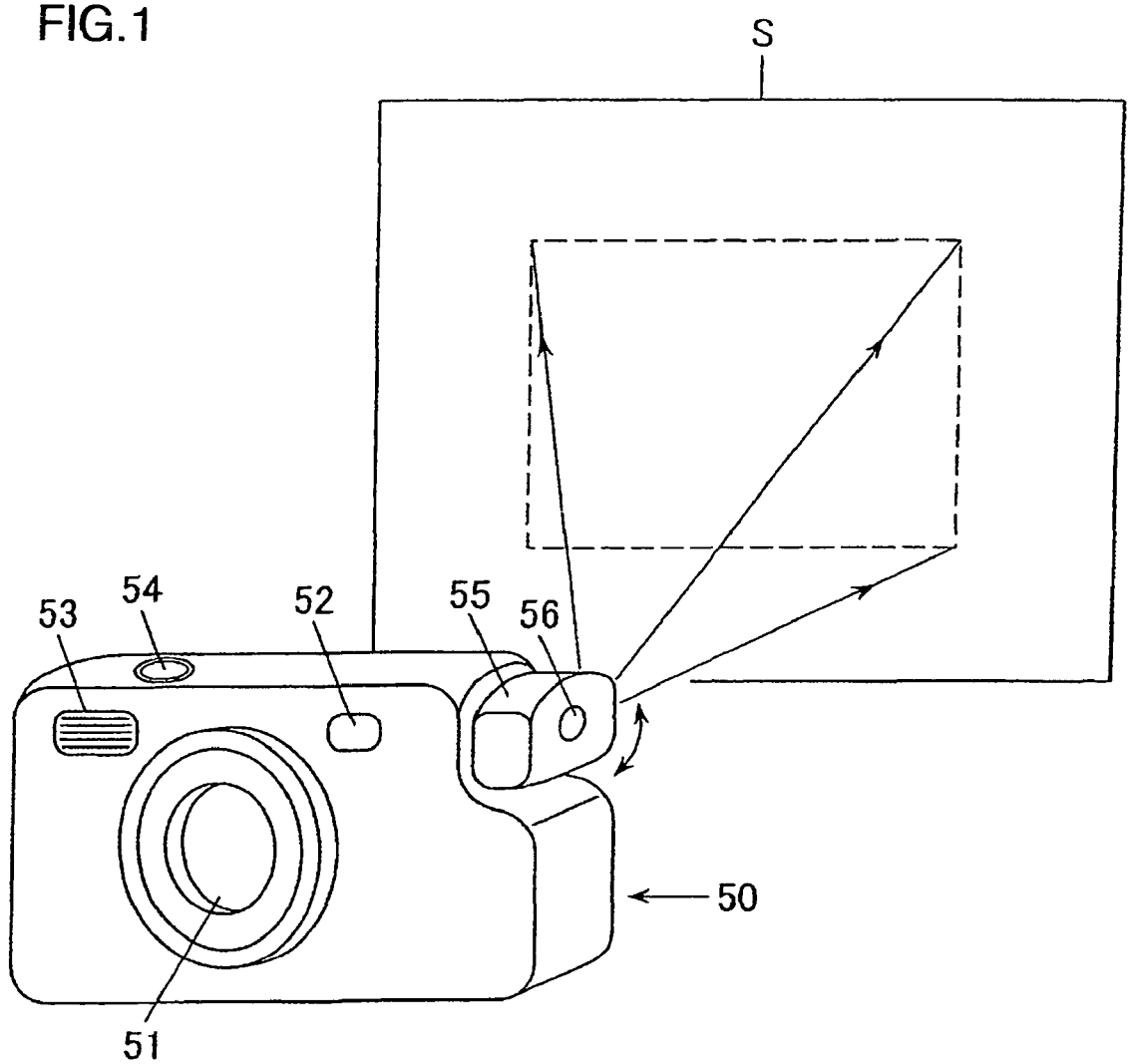
FIG. 1 is a perspective view of an electronic camera with projector, according to a first embodiment of the present invention.

FIG. 1 is a perspective view of an electronic camera with projector according to the first embodiment of the present invention. As shown in FIG. 1, a photographic lens 51, a viewfinder objective window 52 and a flash light window 53 are disposed at the front of this electronic camera with projector 50. At the top surface of the electronic camera with projector 50, a release button 54 is disposed. At the rear surface of the electronic camera with projector 50, a main liquid crystal display device 115 which will be described hereinafter, operation members 112 and a viewfinder eyepiece window 120 (see FIG. 3) are disposed.

A roughly cylindrical shaped housing 55 is supported at the side of the electronic camera with projector 50 by a support portion 56 so as to be free to rotate through ±180°, with the housing being freely rotatable around the support portion 56 as a rotational center. A click mechanism (not shown in the figures) which clicks, for example, at every 10° of rotational angle are provided at the support portion 56.

A projector module which will be described hereinafter is housed within the housing 55, and this projector module projects information such as a picture or the like upon a screen S. The direction of projection by the projector module is arranged to be variable in the vertical direction, due to rotation of the housing 55. A rotational angle detection means which detects the rotational angle of the housing 55 (for example a switch) is also provided to the housing 55.

Figure 2:
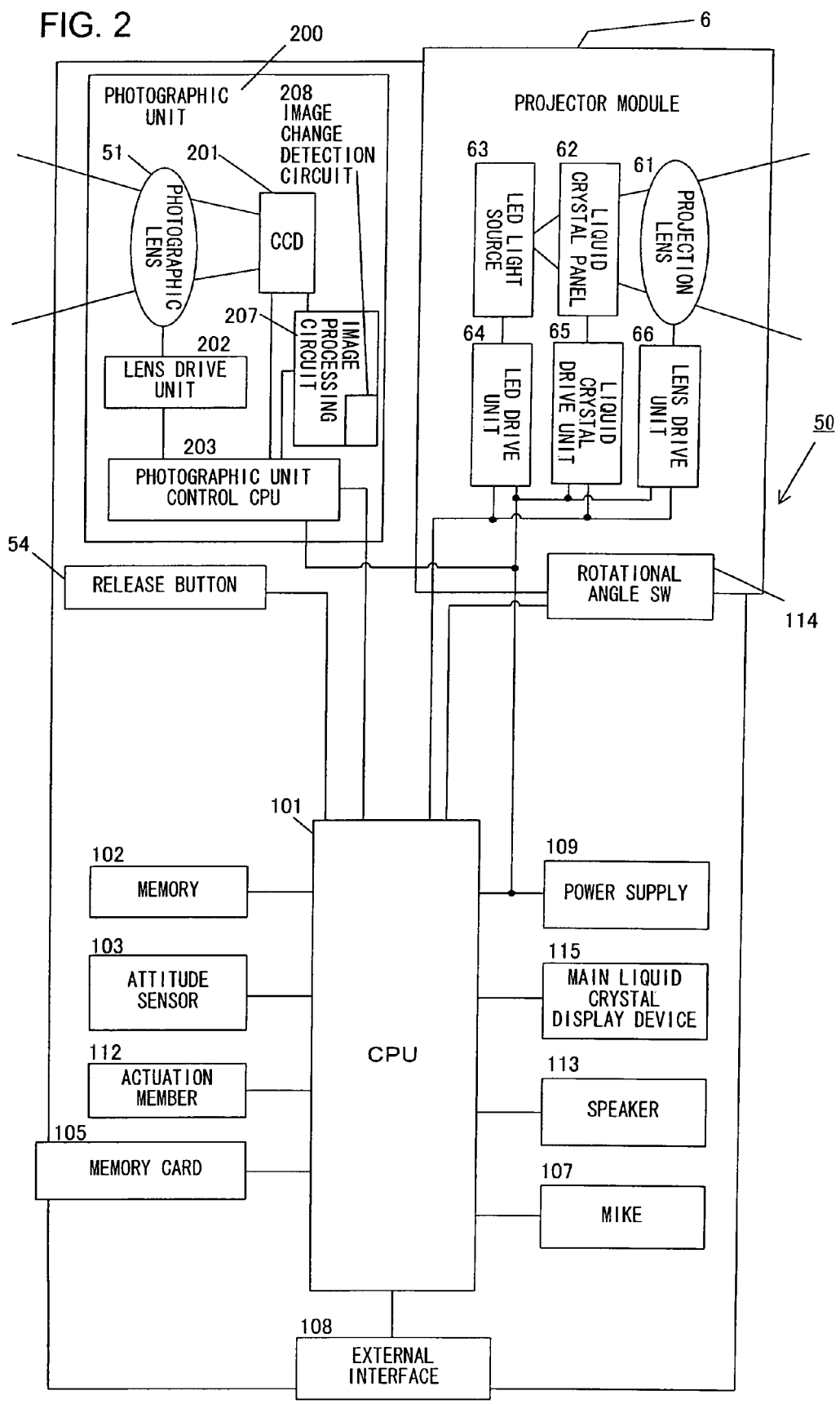
FIG. 2 is a block diagram for explanation of the structure of the electronic camera with projector shown in FIG. 1.

FIG. 2 is a block diagram for explanation of the structure of the electronic camera with projector 50 shown in FIG. 1. In FIG. 2, the electronic camera with projector 50 includes an imaging unit 200, a projector module 6, a CPU 101, a memory 102, an attitude sensor 103, an external interface (I/F) 108, a power supply 109, the operation members 112, a speaker 113, a rotational angle switch (SW) 114, a main liquid crystal display device 115 and a mike 107. A removable memory card 105 is also loaded in the electronic camera with projector 50.

Based upon a control program, the CPU 101 performs predetermined calculation and the like using signal inputted from various units incorporated in the electronic camera with projector 50, and controls each of camera operation and projector operation by sending control signals to various units of the electronic camera with projector 50. It is to be noted that this control program is stored in a non-volatile memory (not shown in the figures) within the CPU 101.

The memory 102 is used as a working memory for the CPU 101. The attitude sensor 103 detects the attitude of the electronic camera with projector 50 and sends its detection signal to the CPU 101. Due to this, the CPU 101 acquires top and bottom information which specifies the top and the bottom of an image during photography (including information for identifying photography with the camera in the vertical position and photography with the camera in the horizontal position).

The memory card 105 is constituted with a non-volatile memory, and, upon command by the CPU 101, it is possible to write, store and read out data.

The mike 107 converts sound which has captured into an electrical signal and sends the electrical signal to the CPU 101. During sound recording, the audio signal is recorded upon the memory card 105. Upon a command from the CPU 101, the external interface 108 transmits and receives data to and from an external device to which it is electrically connected via a cable or a cradle not shown in the figures. It is to be noted that it would also be acceptable for the transmission and reception of data to and from an external device to be performed by wireless. In this case, the external interface 108 would include an antenna, a power amplifier and so on.

The speaker 113 outputs the audio based upon an audio signal outputted from the CPU 101. The operation member 112 sends operation signals corresponding to the buttons which are pressed to the CPU 101.

The power supply 109 consists of, for example, a removable battery pack and a DC/DC conversion circuit or the like, and supplies the necessary electrical power to the various sections within the electronic camera with projector 50. The rotational angle SW 114 detects the rotational angle of the support portion 56. This rotational angle SW 114 outputs an ON signal (H level) when it detects a rotational angle at which the light flux projected by the projector module 6 is being emitted towards the front surface side of the electronic camera with projector 50, and outputs an OFF signal (L level) when it detects a rotational angle at which the light flux is being emitted in some direction other than towards the front surface side of the electronic camera with projector 50.

Upon a command from the CPU 101, the main liquid crystal display device 115 displays information such as a picture or text or the like. The text information may be the operational state of the electronic camera with projector 50, an operation menu, the details of a worksheet for projection or the like.

The imaging unit 200 includes a photographic lens 51, an image sensor 201, a lens drive unit (circuit) 202, an imaging unit control CPU 203 and an image processing circuit 207. The image sensor 201 may be a CCD or CMOS imaging element or the like. The imaging unit control CPU 203 controls the drive of the image sensor 201 and the lens drive unit 202 based upon commands issued by the CPU 101 corresponding to operation of the release button 54 or the operation member 112, and have the image processing circuit 207 perform predetermined image processing. The image processing circuit 207 includes an image change detection circuit 208, and, along with performing white balance processing, gamma processing, shading compensation processing and the like upon the accumulated electric charge signal which is outputted from the image sensor 201, also performs blur correction processing with the image change detection circuit 208. This blur correction processing is performed in order to correct change of the photographic image (vibration which is caused by hand shaking) which takes place if photography is performed with the imaging unit 200 while the electronic camera with projector 50 is being hand-held.

Upon receipt of a zoom control signal from the imaging unit control CPU 203, the lens drive unit 202 drives a zoom lens (not shown in the figures) which is included in the photographic lens 51 toward the telephoto side or the wide-angle side, according to the control signal. The photographic lens 51 forms a subject image onto the imaging surface of the image sensor 201. The imaging unit control CPU 203 engages the image sensor 201 to start an imaging operation, reads out the accumulated electric charge signal from the image sensor 201 once the imaging operation is completed and outputs the image data resulting from the predetermined image processing to the CPU 101. It is to be noted that, when a photographic image is being projected, the image data is sent from the imaging unit control CPU 203 via the CPU 101 to the projector module 6. In the CPU 101, keystone correction processing is performed upon the image data which is to be projected by the projector module 6. It is to be noted that the image data which has been inputted to the CPU 101 can be recorded in the memory card 105, and the image data and audio data recorded upon the memory card 105 can be replayed by each of the projector module 6, the main liquid crystal display device 115 and the speaker 113.

The projector module 6 includes a projection lens 61, a liquid crystal panel 62, an LED light source 63, an LED drive unit (circuit) 64, a liquid crystal drive unit (circuit) 65 and a lens drive unit (circuit) 66. The LED drive unit 64 supplies electrical current to the LED light source 63 according to an LED drive signal which is outputted from the CPU 101. The LED light source 63 illuminates the liquid crystal panel 62 at a brightness corresponding to the electrical current which is supplied.

The liquid crystal drive unit 65 generates a liquid crystal panel drive signal corresponding to the image data, and, by using the generated drive signal, drives the liquid crystal panel 62. More specifically, a voltage corresponding to the image signal is applied to each of the pixels at the liquid crystal layer. The arrangement of the liquid crystal molecules changes in the liquid crystal layer to which voltage has thus been applied, and the light transmittance of the liquid crystal layer changes. By modulating the light from the LED light source 63 in this manner according to the image signal, the liquid crystal panel 62 creates an optical image.

The lens drive unit 66 drives the projection lens forwards and backwards in a direction orthogonal to its optical axis based upon a control signal outputted from the CPU 101. The projection lens 61 projects an optical image emitted from the liquid crystal panel 62 towards a screen or the like. An operation signal for starting projection by the projector module 6 is inputted to the CPU 101, and, according to this operation signal, the CPU 101 starts projection upon receipt of a command for output.

With the present invention, even if the operator does not directly actuate an operation member 112 upon the above described electronic camera with projector 50 during projection, and furthermore even if the operator does not use a remote control transmitter (not shown in the figures), the operator can command the electronic camera with projector 50 to change the projection contents or the like. The contents being projected may be, for example, a still image or a moving image which is photographed by the imaging unit 200 and recorded in the memory card 105, a still image or a moving image which is inputted via the external interface (I/F) 108 from an external device (including a video image or a TV image), a worksheet (a business document or a document for presentation) which is inputted via the external interface (I/F) 108 from an external device, or information showing the operational state of the electronic camera with projector 50 or an operation menu or the like.

Figure 3:
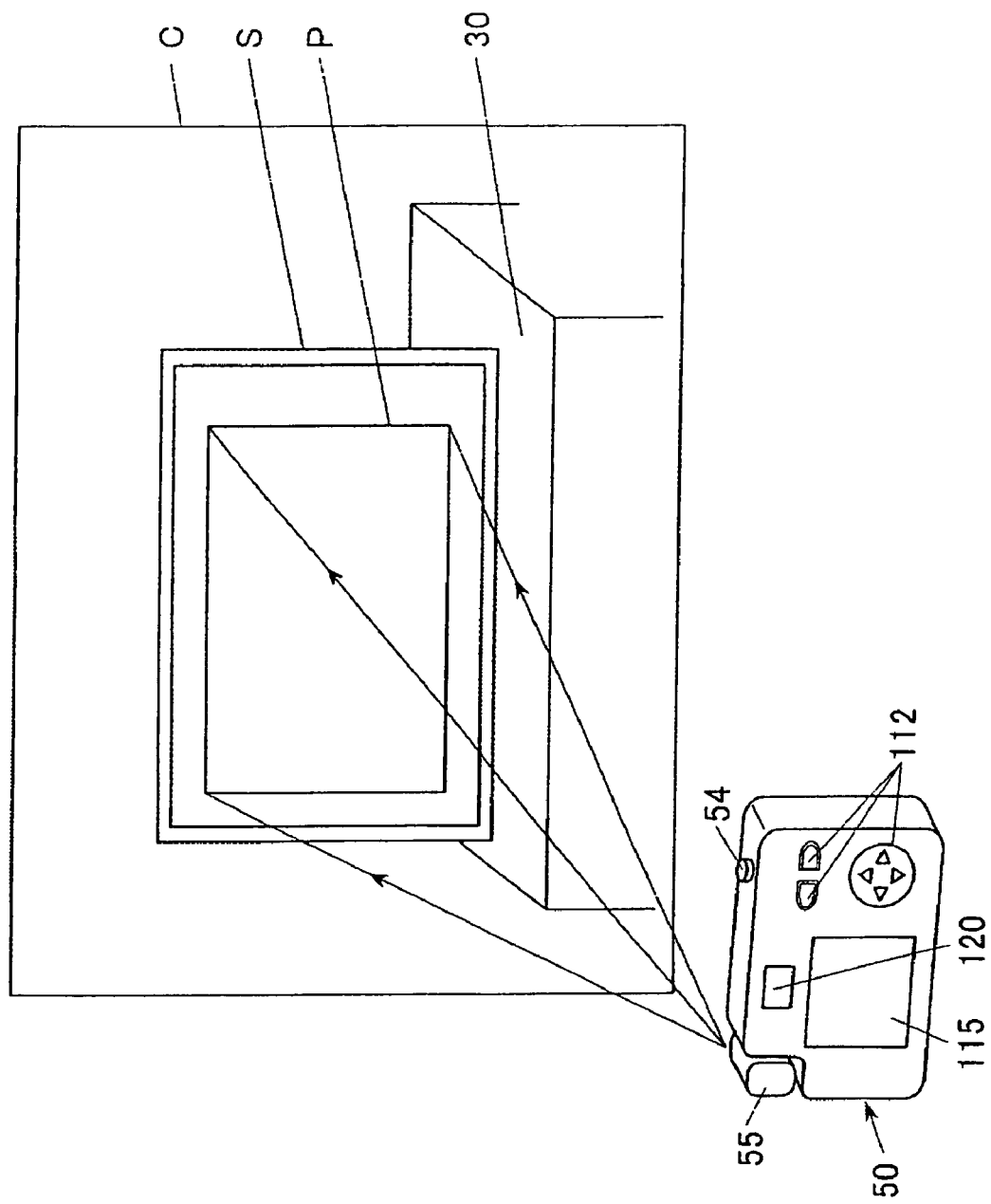
FIG. 3 is a figure showing, while the electronic camera with projector is performing projection towards a screen, photography of an object to be photographed which includes the screen.

In the first embodiment, as shown by way of example in FIG. 3, an object to be photographed which includes the screen S is photographed by the imaging unit 200 while the electronic camera with projector 50 is performing projection towards the screen S from the projector module 6. In the electronic camera with projector 50, when starting projection by the projector module 6, if a mode (hereinafter termed the command detect mode) is set in which it is commanded to change the content being projected irrespective of operation of the operation members 112 or of operation of the remote control transmitter, then the CPU 101 commands the imaging unit 200 to start photographing successive frames of images. The frame rate is set to, for example, 10 frames/second. It is to be noted that the operator set the command detect mode by a menu setting operation or by operation with the operation-members or the like.

In FIG. 3, the screen S is mounted upon a desk 30. The electronic camera with projector 50 is mounted upon a table not shown in the figures in an orientation so that its photographic lens 51 photographs the screen S. The housing 55 of the electronic camera with projector 50 is turned into an orientation so that the projector module 6 projects towards the screen S. The projector module 6 is zoom adjusted so that its projection range P is smaller than the size of the screen S. More specifically, the size of the projection range P upon the screen S is adjusted by the lens drive unit 66 driving a zoom lens (not shown in the figures) incorporated in the projection lens 61 forwards and backwards in the direction of its optical axis, based upon a control signal which is outputted from the CPU 101.

The electronic camera with projector 50 performs photographic operation so as to include the desk 30 within its imaging range C, and the screen S upon the desk 30. The photographic lens 5 is zoom adjusted so that the imaging range of the imaging unit 200 is wider than the range of projection P of the projector module 6. It is to be noted that the main liquid crystal display device 115, the operation members 112 and the viewfinder eyepiece window 120 are provided upon the rear surface of the electronic camera with projector 50.

The details of the command detection processing which the electronic camera with projector 50 performs will now be explained. When performing known blur correction due to hand tremble by correcting the photographic imaging position of the imaging unit 200, the electronic camera with projector 50 employs the image change detection circuit 208 for command detection to extract movement information, based upon movement information obtained from the images which are photographed. In the structure shown by way of example in FIG. 3, one frame at a time of image data is sequentially inputted to the image change detection circuit 208, after having been outputted from the image sensor 201 of the electronic camera with projector 50 which is set in the command detect mode, and after having been signal processed by the image processing circuit 207. And the image change detection circuit 208 extracts a plurality of blocks (for example four blocks) from predetermined regions which have been determined in advance in each inputted frame image.

Figure 4:
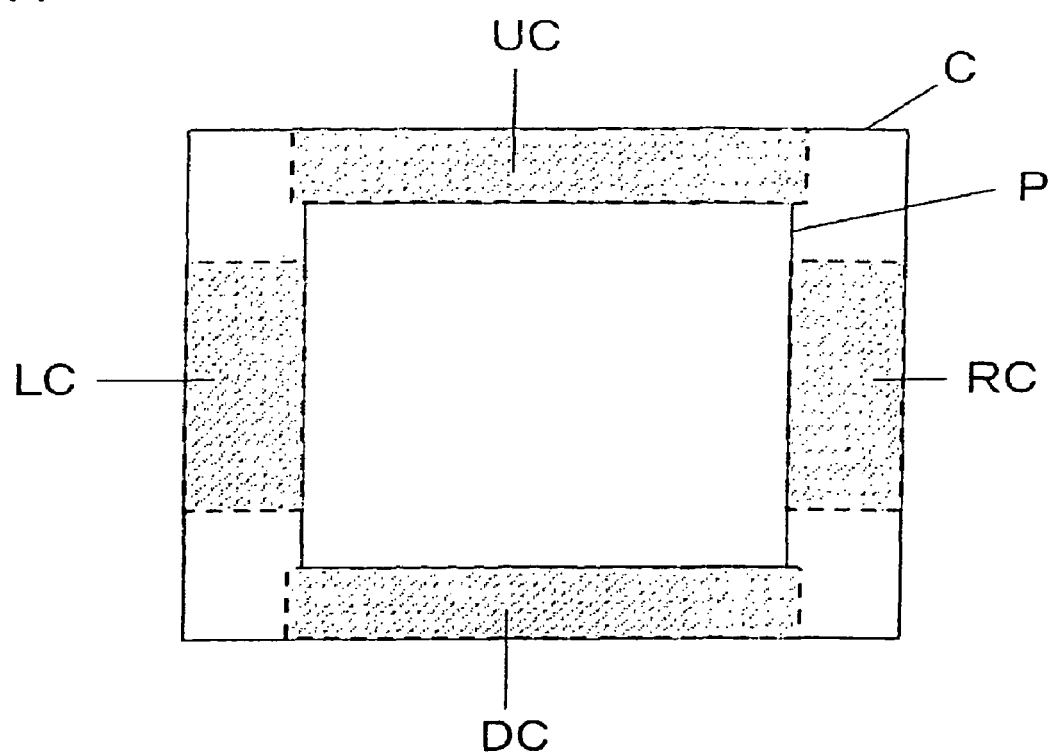
FIG. 4 is a figure for explanation of certain extracted blocks in the first embodiment.

FIG. 4 is a figure for explanation of these extracted blocks in the first embodiment. These four blocks are taken from the region of the imaging range C outside the projection range P, and consist of: a block UC which is positioned above the projection range P, a block DC which is positioned below the projection range P, a block LC which is positioned to the left of the projection range P and a block RC which is positioned to the right of the projection range P. Stationary objects such as the frame of the screen S or the desk 30 or the like are photographed in these four blocks UC, DC, LC and RC, as shown in FIG. 3.

For each of the images of these four blocks which have thus been extracted, the image change detection circuit 208 compares it with the extracted image of the corresponding one of the four blocks which was extracted in the same manner from the image of the previous frame, and decides upon the presence or absence of differences in the photographic image data between these images of temporally successive frames. During the presentation, the operator standing by the screen S may put his hand or the like into, for example, the space which corresponds to the block RC. Due to this, a disparity is caused between the image of the frame which has been newly photographed and the image of the previous frame (i.e. the image changes), since the hand of the operator comes to be included in the block RC of the newly photographed frame image.

Thus, if a block for which the disparity between the image signal which constitutes the newest frame image and the image signal which constitutes the previous frame image has exceeded a predetermined value is detected, the image change detection circuit 208 checks whether this situation has continued for more than 0.5 seconds. Moreover, if, for the block which has been detected, the image change detection circuit 208 has decided that the change within that block with respect to the image before change detection has taken place continuously for at least five successive frames of image signal thereafter (in other words if, for the block RC, a hand or the like has been photographed within that block continuously for 0.5 seconds or more), then it decides that a command input has been performed, and outputs a signal specifying that block to the imaging unit control CPU 203. Upon receipt of the signal specifying a block, the imaging unit control CPU 203 sends a command detection signal and a signal which specifies the detected block or blocks to the CPU 101. On the other hand if, for the block in which change of the image has been detected, it has been decided that change within that block with respect to the image before change detection has not taken place continuously for the next four successive frames (in other words if, in the block RC, the hand or the like stops being photographed before 0.5 seconds has elapsed), then it is decided that command input is not being performed, and no output of any signal is performed to the imaging unit control CPU 203.

Upon receipt of the command detection signal and the signal(s) specifying the block(s) which have been detected, the CPU 101 performs command analysis in the following manner. FIG. 5 is a figure for explanation of a command table. For each of the detected block(s), a command is given according to the contents being projected by the projector module 6. In FIG. 5, the contents are classified into "image replay", "slide show", "TV image", "video replay", "menu", and "worksheet". The detection block(s) are classified into "left", "right", "up", "down", "left→right", "right→left", "up→down", "down→up", and "all of up, down, left and right".

The selection of the contents may be performed, for example, by menu setting operation or by operation of the actuation members 112 or the like. It is to be noted that menu setting before starting projection by the projector module 6 is performed upon a menu screen which is displayed upon the main liquid crystal display device 115. If "image replay" has been selected, then the electronic camera with projector 50 projects a still image. If "slide show" has been selected, then the electronic camera with projector 50 projects still images in turn which are designated in advance. If "TV image" has been selected, then the electronic camera with projector 50 projects a video image or a TV image which is inputted from an external device. If "video replay" has been selected, then the electronic camera with projector 50 projects a moving image. If "menu" has been selected, then the electronic camera with projector 50 projects an operation menu. And, if "worksheet" has been selected, then the electronic camera with projector 50 projects some type of document, such as a business document, which is inputted from an external device.

"Left" for the detected block indicates that a command has been inputted at the block LC in FIG. 4. "Right" for the detection block indicates that a command has been inputted at the block RC in FIG. 4. "Up" for the detected block indicates that a command has been inputted at the block UC in FIG. 4. "Down" for the detected block indicates that a command has been inputted at the block DC in FIG. 4. "left→right" for the detected block indicates that, after a command has been inputted at the block LC, a command has then been inputted at the block RC within the next 0.5 seconds. As shown in FIG. 6, this command input corresponds to the case when, during the presentation, the operator shifts his hand or the like, which was over the space corresponding to the block LC to the space corresponding to the block RC.

In the same manner, "right→left" for the detected block indicates that, after a command has been inputted at the block RC, a command has then been inputted at the block LC within the next 0.5 seconds. "Up→down" for the detected block indicates that, after a command has been inputted at the block UC, a command has then been inputted at the block DC within the next 0.5 seconds. And "down→up" for the detected block indicates that, after a command has been inputted at the block DC, a command has then been inputted at the block UC within the next 0.5 seconds.

Figure 7:
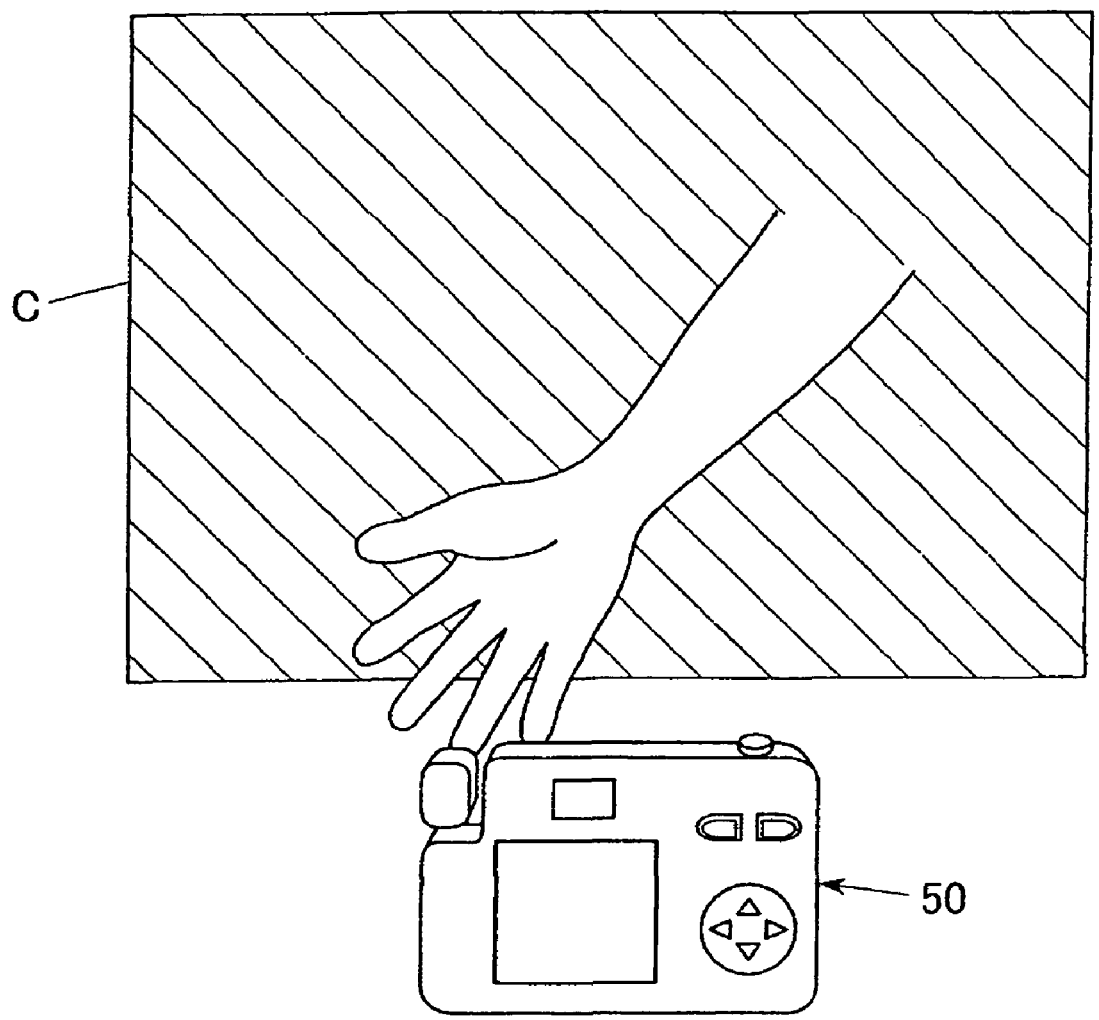
FIG. 7 is a figure for explanation of a case in which a hand is held up so as to obstruct a projection light flux.

Moreover, "all of up, down, left and right" for the detected block indicates the case in which command input has been performed at the same time at all of the four blocks shown in FIG. 4. As shown in FIG. 7, this command input corresponds to the case in which, during the presentation, the operator puts his hand or the like enough to obstruct the projection light flux from the projector module 6, so that the photographic angle of the photographic lens 51 is covered over by his hand.

The command table shown by way of example in FIG. 5 is stored in a non volatile memory (not shown in the figures) within the CPU 101 in advance. The CPU 101 is adapted to refer to this command table when it has received the command detect signal and a signal indicating the detected block(s), and to determine the command according to the projection contents which are currently selected.

For example, when a signal indicating the detected block(s) "left" is received in the state in which "replay image" is set as the projection contents, then the CPU 101 determines the command as being "previous image". In this case, the CPU 101 sends a command to the projector module 6 so that, instead of the image which is currently projecting, it projects the image one shot before. Conversely to the above, when a signal indicating the detected block(s) "right" is received, then the CPU 101 determines the command as being "next image". If the command has been determined as being "next image", then the CPU 101 sends a command to the projector module 6 so that, instead of the image which is currently projecting, it projects the image one shot after.

Upon receipt of a signal indicating the detected block(s) "up", the CPU 101 determines the command as being "sound volume up", and issues a command for the volume of the sound which is being replayed from the speaker to be increased by a predetermined amount. Conversely, upon receipt of a signal indicating the detected block (s) "down", the CPU 101 determines the command as being "sound volume down", and issues a command for the volume of the sound which is being replayed from the speaker to be decreased by a predetermined amount.

Upon receipt of a signal indicating the detected block(s) "left→right", the CPU 101 determines the command as being "ten shots fast forward", and issues a command to the projector module 6 to project the image ten shots later, instead of the image which is currently being projected. Upon receipt of a signal indicating the detected block(s) "right→left", the CPU 101 determines the command as being "ten shots fast reverse", and issues a command to the projector module 6 to project the image ten shots earlier, instead of the image which is currently being projected.

Upon receipt of a signal indicating the detected block(s) "up→down", the CPU 101 determines the command as being "next folder", and issues a command to the projector module 6 to project one of the images which are recorded in the next folder to the folder in which the image currently being projected is recorded, instead of the image which is currently being projected. And, upon receipt of a signal indicating the detected block(s) "down→up", the CPU 101 determines the command as being "previous folder", and issues a command to the projector module 6 to project the images which are recorded in the previous folder to the folder in which the image currently being projected is recorded, instead of the image which is currently being projected.

Finally, upon receipt of a signal indicating the detected block(s) "all of up, down, left and right", the CPU 101 determines the command as being "end replay", and issues a command to the projector module 6 to stop replaying the image which is being projected. It is to be noted that it would also be acceptable to arrange for the selection of the projection contents as shown in FIG. 5 to be performed by the same technique as the one described above.

In the following, the commands for the case when the projection contents are different from "replay image" will be explained. It is to be noted that explanation of commands which are common with "replay image" is omitted. If the projection contents is "slide show", then, upon receipt of a signal indicating the detected block(s) "all of up, down, left and right", the CPU 101 determines the command as being "pause", and issues a command to pause advancing through shots. During pause, upon receipt of a signal indicating the detected block(s) "all of up, down, left and right", the CPU 101 determines the command as being "restart", and issues a command to resume advancing through shots.

If the projection contents is "TV image", then, upon receipt of a signal indicating the detected block(s) "left", the CPU 101 determines the command as being "previous channel", and issues a command to the external device to change over to the channel which is set one previously. Upon receipt of a signal indicating the detected block(s) "right", the CPU 101 determines the command as being "next channel", and issues a command to the external device to change over to the channel which is set one after.

Furthermore, if the projection contents is "TV image", then, upon receipt of a signal indicating the detected block(s) "left→right", the CPU 101 determines the command as being "last channel", and issues a command to the external device to change over to the highest numbered channel. Upon receipt of a signal indicating the detected block(s) "right→left", the CPU 101 determines the command as being "first channel", and issues a command to the external device to change over to the lowest numbered channel.

Furthermore, if the projection contents is "TV image", then, upon receipt of a signal indicating the detected block(s) "up→down", the CPU 101 determines the command as being "audio signal down", and issues a command to the external device to request the audio signal level to be reduced. Upon receipt of a signal indicating the detected block(s) "down→up", the CPU 101 determines the command as being "audio signal up", and issues a command to the external device to request the audio signal level to be increased.

Finally, if the projection contents is "TV image", then, upon receipt of a signal indicating the detected block(s) "all of up, down, left and right", the CPU 101 determines the command as being "TV off", and issues a command to the external device to request the output of the image signal and the audio signal to be terminated. It would also be acceptable to arrange for the CPU 101, upon receipt of a signal indicating the detected block(s) "all of up, down, left and right", to determine the command as being "TV on", and to issue a command to the external device to request the output of the image signal and the audio signal to be started. It would also be acceptable for the commands inputted in this manner to be commands which control external devices of the electronic camera with incorporated projector.

If the projection contents is "video replay", then, upon receipt of a signal indicating the detected block(s) "left", the CPU 101 determines the command as being "fast reverse", and issues a command to return back through the frames of the moving image which is being projected. Upon receipt of a signal indicating the detected block(s) "right", the CPU 101 determines the command as being "fast forward", and issues a command to advance quickly forward through the frames of the moving image which is being projected.

Furthermore, if the projection contents is "video replay", then, upon receipt of a signal indicating the detected block(s) "left→right", the CPU 101 determines the command as being "fast forward to end", and, along with issuing a command to the projector module 6 to project the image of the last frame, instead of the image which is currently being projected, also issues a command to pause advancing through the frames. Upon receipt of a signal indicating the detected block(s) "right→left", the CPU 101 determines the command as being "return to start", and, along with issuing a command to the projector module 6 to project the image of the first frame, instead of the image which is currently being projected, also issues a command to pause advancing through the frames.

Finally, if the projection contents is "video replay", then, upon receipt of a signal indicating the detected block(s) "all of up, down, left and right", the CPU 101 determines the command as being "pause", and issues a command to pause advancing through the frames. Moreover, during pause, upon receipt of a signal indicating the detected block(s) "all of up, down, left and right", the CPU 101 determines the command as being "restart", and issues a command to resume advancing through the frames.

If the projection contents is "menu", then, upon receipt of a signal indicating the detected block(s) "left", the CPU 101 determines the command as being "cursor to left", and issues a signal (a command) to the projector module 6 for shifting the position of a cursor in the leftward direction in the menu image which is being projected. Upon receipt of a signal indicating the detected block(s) "right", the CPU 101 determines the command as being "cursor to right", and issues a signal (a command) to the projector module 6 for shifting the position of the cursor in the rightward direction in the image which is being projected.

Furthermore, if the projection contents is "menu", then, upon receipt of a signal indicating the detected block(s) "up", the CPU 101 determines the command as being "cursor up", and issues a signal (a command) to the projector module 6 to shift the position of the cursor in the upward direction in the menu image which is being projected. Upon receipt of a signal indicating the detected block(s) "down", the CPU 101 determines the command as being "cursor down", and issues a signal (a command) to the projector module 6 for shifting the position of the cursor in the downward direction in the image which is being projected.

Moreover, if the projection contents is "menu", then, upon receipt of a signal indicating the detected block(s) "left→right", the CPU 101 determines the command as being "scroll left", and issues a signal (a command) to the projector module 6 to shift the position of the cursor in the rightward direction in the menu image which is being projected. Upon receipt of a signal indicating the detected block(s)

"right→left", the CPU 101 determines the command as being "scroll right", and issues a signal (a command) to the projector module 6 for shifting the position of the cursor in the leftward direction in the menu image which is being projected.

If the projection contents is "menu", then, upon receipt of a signal indicating the detected block(s) "up→down", the CPU 101 determines the command as being "scroll up", and issues a signal (a command) to the projector module 6 to shift the position of the cursor in the downward direction in the menu image which is being projected. Upon receipt of a signal indicating the detected block(s) "down→up", the CPU 101 determines the command as being "scroll down", and issues a signal (a command) to the projector module 6 for shifting the position of the cursor in the upward direction in the menu image which is being projected.

If the projection contents is "menu", then, upon receipt of a signal indicating the detected block(s) "all of up, down, left and right", the CPU 101 determines the command as being "confirm", and issues a command to perform setting processing of the contents indicated by the cursor on the menu screen which is being projected.

If the projection contents is "worksheet", then, upon receipt of a signal indicating the detected block(s) "left", the CPU 101 determines the command as being "scroll left", and issues a signal (a command) to the projector module 6 for shifting the image which is being projected in the rightwards direction. Upon receipt of a signal indicating the detected block(s) "right", the CPU 101 determines the command as being "scroll right", and issues a signal (a command) to the projector module 6 for shifting the image which is being projected in the leftwards direction.

Furthermore, if the projection contents is "worksheet", then, upon receipt of a signal indicating the detected block(s) "up", the CPU 101 determines the command as being "scroll up", and issues a signal (a command) to the projector module 6 for shifting the image which is being projected in the downwards direction. Upon receipt of a signal indicating the detected block(s) "down", the CPU 101 determines the command as being "scroll down", and issues a signal (a command) to the projector module 6 for shifting the image which is being projected in the upwards direction.

Moreover, if the projection contents is "worksheet", then, upon receipt of a signal indicating the detected block(s) "left→right", the CPU 101 determines the command as being "next page", and issues a signal (a command) to the projector module 6 in order to project an image of the next page of the document, instead of the image which is being projected. Upon receipt of a signal indicating the detected block(s) "right→left", the CPU 101 determines the command as being "previous page", and issues a signal (a command) to the projector module 6 in order to project an image of the previous page of the document, instead of the image which is being projected.

If the projection contents is "worksheet", then, upon receipt of a signal indicating the detected block(s) "up→down", the CPU 101 determines the command as being "final page", and issues a signal (a command) to the projector module 6 in order to project an image of the final page of the document, instead of the image which is being projected. Upon receipt of a signal indicating the detected block(s) "down→up", the CPU 101 determines the command as being "first page", and issues a signal (a command) to the projector module 6 in order to project an image of the first page of the document, instead of the image which is being projected.

Finally, if the projection contents is "worksheet", then, upon receipt of a signal indicating the detected block(s) "all of up, down, left and right", the CPU 101 determines the command as being "end", and issues a command to the projector module 6 to terminate replay of image which is being projected.

It is to be noted that, if the aspect ratio of the image which constitutes the contents for projection is different from the aspect ratio of the image projected by the liquid crystal panel 62, then this causes regions (non-image portions) within the projection image in which no information from the projected contents is present. For example, if the aspect ratio of the image projected by the liquid crystal panel 62 is 4:3, while the aspect ratio of the image which constitutes the contents for projection is 16:9, then non-image portions are created at the top and the bottom of the projection screen. It would also be acceptable to arrange for these non-image portions to constitute the detected blocks. In this case, it would be acceptable to change the positions of the detected blocks according to the aspect ratio of the image which constitutes the projection contents.

The first embodiment explained above will now be summarized.

(1) During projection towards the screen S from the projector module 6 of the electronic camera with projector 50, photography of successive frame images is performed by the imaging unit 200 for a range which is broader than the projection range P of the projector module 6. The frame rate is taken as being 10 frames/second. When projection by the projector module 6 is started, it is arranged, if a setting has been made to the command detect mode in which change of the projection contents irrespective of actuation of any of the members 112 or actuation of the remote control transmitter is commanded, for the electronic camera with projector 50 automatically to issue a command for the start of continuous photography of frame images by the imaging unit 200. Since the start of photography is performed automatically, accordingly the convenience of use is enhanced, since actuation is omitted. The same beneficial effect may be obtained with a structure in which the imaging unit 200 is automatically commanded to start continuous photography of image frames if an ON signal is outputted by the rotational angle SW 114 so that the projection module 6 has been put into its projection state.

(2) It is supposed that, among the region from the range C of photography by the imaging unit 200 excluding the range P of projection by the projector module 6, the four blocks consisting of the block UC which is positioned in the upper portion of the projection range P, the block DC which is positioned in the lower portion of the projection range P, the block LC which is positioned in the left portion of the projection range P, and the block RC which is positioned in the right portion of the projection range P (i.e. the extracted blocks) are used as spaces for command input. During presentation, the operator performs input actuation by putting his hand or the like into a space which corresponds to any one of these four blocks. The electronic camera with projector 50 detects change of the image which is caused by this hand or the like being included in the frame image which is most freshly photographed, and decides that command input actuation has been performed. Since these spaces for command input are provided in regions which are not included in the projection range P, accordingly obstructions of the projection light flux by the hand of the operator or the like are reduced, and no feeling of discomfort is imparted to a person who is observing the projected image. Furthermore, since the presence or absence of command input is detected by using image data which has been obtained by photographing a stationary object such as the frame of the screen S or the desk 30 or the like, accordingly it is possible to decide upon the presence or absence of command input, irrespective of whether the contents being projected by the projector module 6 is a still image or is a moving image (including a video image or a TV image). Since the four blocks are provided roughly at positions above, below, to the left and to the right of the projection range P, accordingly it is not necessary for the electronic camera with projector 50 to perform any precise position detection calculation processing. From the point of view of the operator, the projection range P is utilized as a visual reference, and constitutes a standard for the space in which he is to put his hand. Moreover, since it is arranged to detect image changes only from the blocks which are extracted, accordingly it is possible to reduce the amount of calculation, as compared to the case of detecting it from the entire area of the image.

(3) Commands corresponding to the above described four blocks (spaces for command input) which have been prepared in advance for each type of projection contents are stored in advance in a command table, and the contents of commands are determined by referring to the command table. Accordingly, whichever of these projection contents may be selected, it is possible to determine the command simply and easily by detecting into which one of the four blocks the user has put his hand. Moreover, it is possible to command the electronic camera with projector 50 to change the projection contents with a simple structure, since, in contrast to situation with the prior art, it is not necessary to perform any complicated analysis processing in order to identify some geometric pattern.

(4) Since it is decided that command input actuation has been performed if a hand or the like has been put into a space for command input continuously for 0.5 seconds or more, an immediate erroneous decision is not made even if the operator has put his hand in front of the photographic lens 51 by mistake.

Variant Embodiment 1

In the above explanation, it was supposed that the decision of "all of up, down, left and right" was taken if changes of all of the image signals for all of the four blocks were detected in the same time period. Instead of this, it would also be acceptable to arrange to take the decision of "all of up, down, left and right" if, for example, changes of the image signals corresponding to 70% or more of all of the pixels which make up the image sensor 201 are detected.

Variant Embodiment 2

Furthermore, it would also be acceptable to arrange, when change of the image signal for any one of the four blocks has been detected, to make this command input actuation ineffective, if changes of all of the image signals which correspond to all of the pixels which make up the image sensor 201 have been detected. By doing this, for example, it would be possible to prevent a mistaken decision being taken due to lighting within the room being turned on or turned off, or the like.

Variant Embodiment 3

Even further, it would also be acceptable to arrange for power supply OFF processing for the projector module 6 or the electronic camera with projector 50 to be performed, if the photographic lens is shielded from the light, so that all of the image signals which correspond to all of the pixels which make up the image sensor 201 drop to less than or equal to a predetermined level.

Second Embodiment

Figure 8:
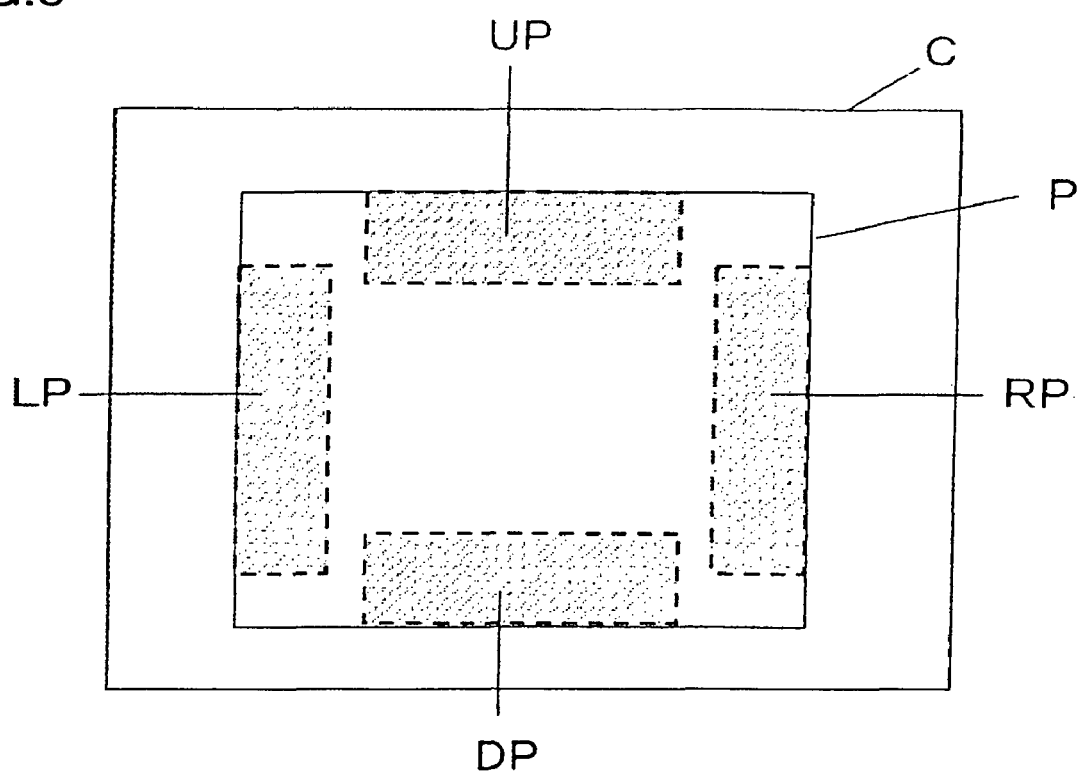
FIG. 8 is a figure for explanation of extracted blocks in a second embodiment.

In a second embodiment, the point at which the imaging unit 200 of the electronic camera with projector 50 photographs successive frame images for a roughly equal range to the range P of projection by the projector module 6, or for a broader range than that projection range P, and the positions of the four blocks which are spaces for command input are different as compared to the first embodiment. A roughly equal range means a state in which the area of one of the imaging range C and the projection range P is within the range of 0.8 to 1.2 times the area of the other thereof, and it does not matter which is the greater. FIG. 8 is a figure for explanation of the extracted blocks in the second embodiment. These four blocks consist of a block UP which is positioned at an upper portion within the projection range P, a block DP which is positioned at a lower portion within the projection range P, a block LP which is positioned at a left portion within the projection range P, and a block RP which is positioned at a right portion within the projection range P. With these four blocks UP, DP, LP and RP, each of their projection images is photographed. At least a portion of each of the four blocks UP, DP, LP and RP is set so as to be included within the imaging range of the imaging unit 200.

In the second embodiment, selection of still image contents (including a menu or a worksheet) as the contents to be projected by the projector module 6 is permitted, but selection of moving image contents (including a video image or a TV image) is prohibited.

While a still image with the same contents is continuously projected in the same display state, the image change detection circuit 208 compares each of the images of the four blocks described above with the extracted image for the corresponding one of the four blocks obtained in the same manner from the previous frame image, and decides upon the presence or absence of difference between the photographic image data of these temporally successive frame images. Since the manner in which, during a presentation, the operator puts his hand into the space which corresponds to each of the blocks from the side of the screen S, the manner in which the image change detection circuit 208 decides upon the presence or absence of command input by detecting disparity between the image signal for the newest frame image and the image signal for the previous frame image, and the manner in which the CPU 101 performs command analysis are the same as in the case of the first embodiment, explanation thereof will be omitted. On the other hand, upon change of the display state of the projection image (scrolling, zooming in, zooming out, fading in, fading out, change of the brightness of the projection image or the like) or change of the display contents or the like, even though change of the image is detected by the image change detection circuit 208 for each of the blocks, the CPU 101 may decide that command input has been performed without performing any command analysis. By doing this, the device is prevented from being controlled due to some change of the image which is not intended to be input of a command, which would be undesirable.

The second embodiment explained above will now be summarized.

(1) During projection towards the screen S from the projector module 6 of the electronic camera with projector 50, photography of successive frame images is performed by the imaging unit 200 of the electronic camera with projector 50 for a range which is roughly equal to the projection range P of the projector module 6, or is broader than the projection range P. The frame rate is taken as being 10 frames/second.

(2) The four blocks which consist of the block UP positioned at an upper portion, the block DP positioned at a lower portion, the block LP positioned at a left portion, and the block RP positioned at a right portion are taken as being spaces for command input within the range P of projection by the projector module 6. During presentation, the operator performs input action by putting his hand or the like into the space which corresponds to any one of these four blocks. The electronic camera with projector 50 decides that command input actuation has been performed upon detection of change in the image generated due to this hand being included in a frame image which is newly photographed. Since the spaces for command input are provided within the projection range P, it is possible to decide upon the presence or absence of command input, even if, due to a reason such as the periphery of the projection range P being dark or the like, it would not be possible to decide upon the presence or absence of command based upon the method of the first embodiment.

(3) Since the CPU 101 forbids selection of moving image contents, it is possible to prevent change of the projection contents being erroneously decided as being the input of a command.

(4) In the same manner as in the case of the first embodiment, it is not necessary to perform any precise positional detection with the electronic camera with projector 50, so that, from the point of view of the operator, it is possible to take the projection range P as a standard for the space for him to insert his hand into.

Third Embodiment

In a third embodiment, as compared to the first embodiment and the second embodiment, the manner in which the presence or absence of command input is decided upon by utilizing the auto focus (AF) function of the imaging unit 200, and the positions of the four blocks which constitute the space used for command input, are different. In the third embodiment, just as in the first embodiment, it is arranged for it to be possible to select, as the contents to be projected by the projector module 6, either a still image (including a menu or a worksheet) or a moving image (including a video image or a TV image).

The AF (automatic focus detection) operation which is performed by the imaging unit 200 will now be explained. For the image data which is outputted from the image sensor 201 and has been signal processed by the image processing circuit 207, the imaging unit control CPU 203 obtains a focus evaluated value by extracting and integrating the high frequency component of the data corresponding to a predetermined region (termed the focus detection area) which is determined in advance within the imaging range C. The calculation of the focus evaluated value is performed while shifting a focus lens, not shown in the figures but provided within the photographic lens 51, from its close-up extreme to its infinity extreme, in order to perform focus adjustment. By doing this, a plurality of focus evaluated values are obtained, corresponding to a plurality of focus lens positions.

When the focus is set to the object to be photographed, the focus evaluated value assumes a large value due to the contrast of the object to be photographed becoming high, while, when the focus is wrong, it assumes a small value due to the contrast of the image of the object to be photographed decreasing. The position of the focus lens at which the focus evaluated value becomes a maximum (its focus position) is the position at which blurring of the edges of the image of the object to be photographed by the image sensor 201 disappears, at least in the focus detection area, so that the contrast of the image becomes a maximum. The imaging unit control CPU 203 sends a command to the lens drive unit 202 so as to shift the focus lens to this focus position. With the above, the focus adjustment to the object to be photographed is completed.

The imaging unit 200 of the electronic camera with projector 50 in the third embodiment photographs successive frame images for a roughly equal range to the range P of projection by the projector module 6, or for a broader range than that projection range P.

Figure 9:
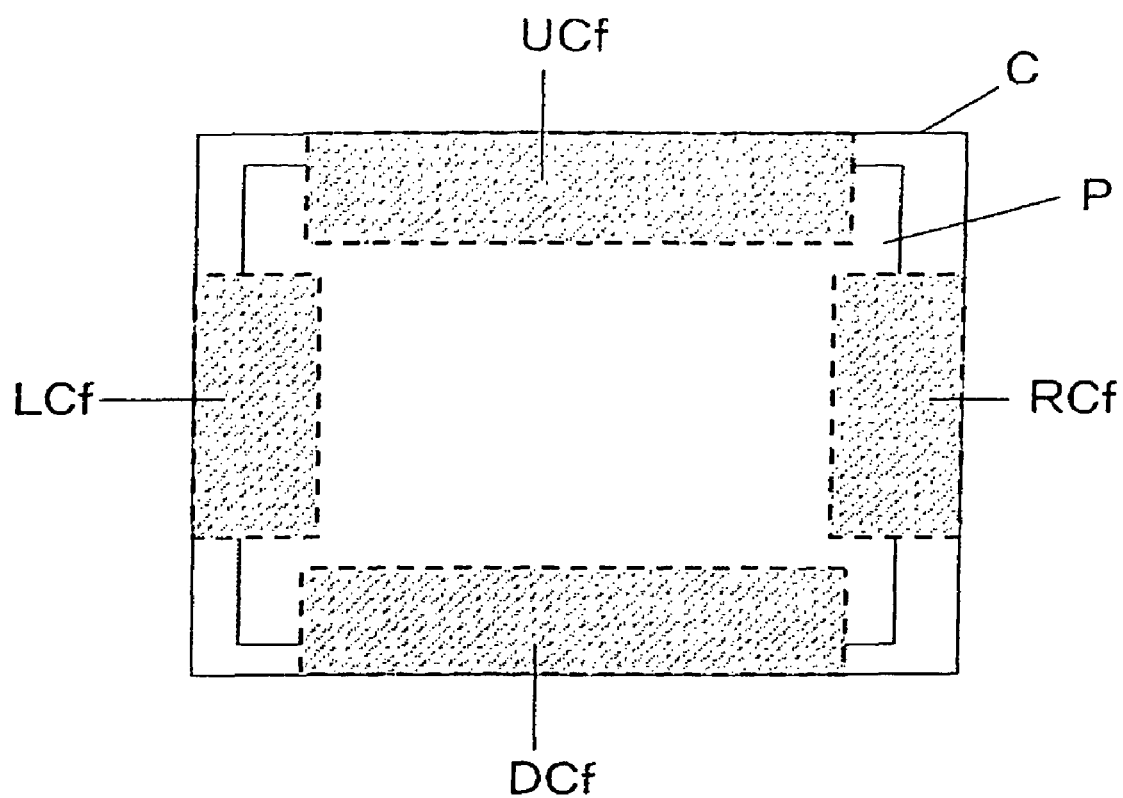
FIG. 9 is a figure for explanation of extracted blocks in a third embodiment.

The space (the extracted blocks) for command input are determined as shown in FIG. 9. In FIG. 9, the four blocks consist of a block UCf which is positioned at an upper portion within the imaging range C, a block DCf which is positioned at a lower portion within the imaging range C, a block LCf which is positioned at a left portion within the imaging range C, and a block RCf which is positioned at a right portion within the imaging range C. A portion of each of these blocks UCf, DCf, RCf and LCf may be included within the projection range P.

If the command detect mode is set, the imaging unit control CPU 203 repeatedly calculates the focus evaluated value for each of the images of the above described four blocks, for example once every 0.5 seconds, and decides upon the presence or absence of change in the focus evaluated values. Since the frame of the screen S is included in each of the blocks UCf, DCf, RCf and LCf (the projection image is also included if a portion of the projection range P is included), the focus adjustment is performed according to the contrast information which is obtained based upon the frame of the screen S. Since, in this embodiment, the distance between the electronic camera with projector 50 and the screen S does not vary, the focus evaluated value which is calculated for each of the blocks assumes an value for that respective block which is almost constant.

When, in this state, during a presentation, the operator puts his hand into the space which corresponds to, for example, the block RCf, then the focus evaluated value which corresponds to the block RCf changes. When the photographic unit CPU 203 detects that a focus evaluated value has changed by an amount which is greater than a predetermined value, then it checks whether or not this situation has continued for more than 0.5 seconds. If, for the detected block, the calculated focus evaluated value has stayed changed for more than 0.5 seconds (in other words, if the hand of the operator has been kept put over the block RCf for 0.5 seconds or greater), then the imaging unit control CPU 203 decides that command input has taken place, and issues a command detect signal to the CPU 101 and a signal specifying the block. On the other hand if, for the detected block, the calculated focus evaluated value after 0.5 seconds returns to its original value (in other words, if the hand of the operator has not been kept put over the block RCf while 0.5 seconds elapses), then the imaging unit control CPU 203 decides that command input has not taken place. According to the type of structure described above, even if the four blocks include the projection range P, and a moving image is being projected as the projection contents, and even if the focus evaluated value changes due to change over time of the moving image which is being projected, since the change of the focus evaluated value due to a hand being put over the block is much greater, it is possible to make the decision as to whether a hand has been put in or not by comparing the focus evaluated value with the predetermined reference value.

The manner in which, upon receipt of the command detect signal and the signal indicating the detected block from the imaging unit control CPU 203, the CPU 101 performs command analysis, which is the same as in the first and the second embodiments, and accordingly explanation thereof will be omitted.

The third embodiment explained above will now be summarized.

(1) While projection towards the screen S is being performed from the projector module 6 of the electronic camera with projector 50, successive frame images are photographed by the imaging unit 200 of the electronic camera with projector 50, with a range which is roughly equal to the range P of projection by the projector module 6 or is wider than the projection range P, and the focus evaluated value for each of the blocks is calculated continuously. The period at which the focus evaluated values are calculated may be 2 frames/second.

(2) The four blocks within the range C of photography by the imaging unit 200, i.e. the block UCf which is positioned at the upper portion thereof, the block DCf which is positioned at the lower portion thereof, the block LCf which is positioned at the left portion thereof, and the block RCf which is positioned at the right portion thereof, are taken as being spaces for input of commands. During a presentation, the operator performs input actuation by passing his hand or the like into the space corresponding to any one of these four blocks. Since the electronic camera with projector 50 detects change of a focus evaluated value within a block caused by the hand being included in the frame image which is newly photographed, and decides that command input actuation has been performed, accordingly it is possible to decide upon the presence or absence of command input, irrespective of whether the contents being projected by the projector module 6 is a still image or is a moving image (including a video image or a TV image).

(3) In the same manner as with the first embodiment and the second embodiment, it is not necessary for the electronic camera with projector 50 to perform any precise position detection calculation processing, and, from the point of view of the operator, the projection range P may be taken as a standard for the space for putting his hand into.

Variant Embodiment 4

It would also be acceptable to combine the third embodiment and the second embodiment described above. In this case, if a still image (a menu, a worksheet, or the like) is selected as the projection contents, then the electronic camera with projector 50 performs command detection according to the second embodiment (the method of detecting differences in the photographic image data between frames); while, if a moving image (including a video image or a TV image) is selected as the projection contents, then it performs command detection according to the third embodiment (the method of detecting change in the focus evaluated value). Since, by doing this, it is possible to prevent movement of a moving image being taken as being change of the image, thus preventing such movement being mistakenly decided as being command input, it is possible to perform command input in an appropriate manner, in correspondence to the contents which are being projected.

Variant Embodiment 5

In the above explanation, it was arranged to detect change of the focus evaluated value by performing AF operation by the so called contrast method, using image data obtained from the image sensor 201 of the imaging unit 200, and to use change of the focus evaluated values which have been detected in deciding upon the presence or absence of command input. Instead of AF operation by the contrast method, it would also be acceptable to perform AF operation by some other method. For example, focus evaluation information (focus adjustment information) may be acquired by performing AF operation or the like by a phase difference method, as disclosed in Japanese Laid-Open Patent Publication H09-274132. In this case, the focus evaluation information may be acquired based upon the relative interval between the pair of images which are joined upon the line sensor by the pair of light fluxes for focus detection which pass through the focus detection optical system. Four pairs of these light fluxes for focus detection are provided, respectively corresponding to the four blocks UCf, DCf, LCf and RCf shown in FIG. 9.

When the command detect mode is set, the imaging unit control CPU 203 repeatedly detects, for example every 0.5 seconds, the relative gap between each pair of images joined by the above described four pairs of light fluxes for focus detection, and decides upon the presence or absence of change of these relative gaps (in other words, of the focus evaluation information). When, during a presentation, the operator puts his hand into, for example, the space which corresponds to the block RCf, then the relative gap between the pair of images which correspond to the block RCf changes. The imaging unit control CPU 203 decides that a command input has been performed, if this state in which the relative gap has changed continues even after 0.5 seconds has elapsed. It is to be noted that, in this case, it is not necessary to perform photographic operation by the image sensor 201, since the focus evaluation information is obtained from the result of photography by the line sensor.

It would be acceptable for the focus detection optical system to utilize one portion of the light flux that passes through the photographic lens; and it would also be acceptable for it to utilize a light flux other than the light that passes through the photographic lens (so called external light type AF operation). Furthermore, as far as the AF method is concerned, it would be acceptable to utilize an active AF method, in which the focus evaluation information for focus detection is acquired by projecting infrared light or the like by the imaging unit 200; or it would also be acceptable to utilize a passive AF method, in which the focus evaluation information is not acquired by projecting infrared light or the like by the imaging unit 200.

Variant Embodiment 6

In the first through the third embodiments explained above, it was arranged for the size of the range P of projection by the projector module 6 to be smaller than the size of the range C of photography by the imaging unit 200, or for the two of them to be of roughly equal size. In either case, all of the projection range P (i.e. almost its entire area) was included within the imaging range C. Instead of this, it would also be acceptable to arrange to set the projection direction and the photographic direction so that the projection range P is not included within the imaging range C.

For example, in FIG. 3, with the projection range P upon the screen S by the projector module 6 left just as it is, a region lower than the screen S may be photographed with the imaging unit 200. The CPU 101 of the electronic camera with projector 50 displays the image which has been photographed as a monitor image upon the liquid crystal display device 115. The CPU 101 further displays a display which indicates the range of the detected blocks UCf, DCf, RCf and LCf shown in FIG. 9, by overlapping it with the monitor image within the display upon the liquid crystal display device 115. While looking at the monitor image upon the liquid crystal display device 115, the operator inserts his hand in front of the photographic lens 51, and moves his hand so that his hand is displayed within the range of a detected block which is being displayed as an overlay upon the liquid crystal display device 115.

The electronic camera with projector 50 detects change of the focus evaluated value within a block caused by a hand being included in the frame image which is photographed, and decides that command input actuation has been performed. Even though, in this manner, the projection range P is not utilized as a point of visual reference for the space into which the operator has put his hand, from the monitor image which is displayed upon the liquid crystal display device 115, and from the range of the detected block which is displayed as an overlay, the operator can recognize space to put his hand into.

Moreover, it would also be acceptable to arrange for the above described main liquid crystal display device 115 to be supported by a free angle member so as to be freely rotated. Such a free angle member should support the main liquid crystal display device 115 so that it can face in any direction, either upper or lower, such as facing towards the direction of its front surface, facing towards the direction of its rear surface, facing towards the direction of its left surface, or facing towards the direction of its right surface. By adopting such a structure, it is possible for the operator to check the display screen of the main liquid crystal display unit 115, whether it be positioned on the left side of the screen S or upon its right side.

Fourth Embodiment

With the electronic camera with projector 50 in the fourth embodiment, information (the control details) specifying the commands which correspond to the spaces used for command input (for example, the four extracted blocks) is projected by the projector module 6 upon the screen S, along with the contents image. This projection of command information could also be performed in combination with any of the first through the third embodiments.

Figure 10:
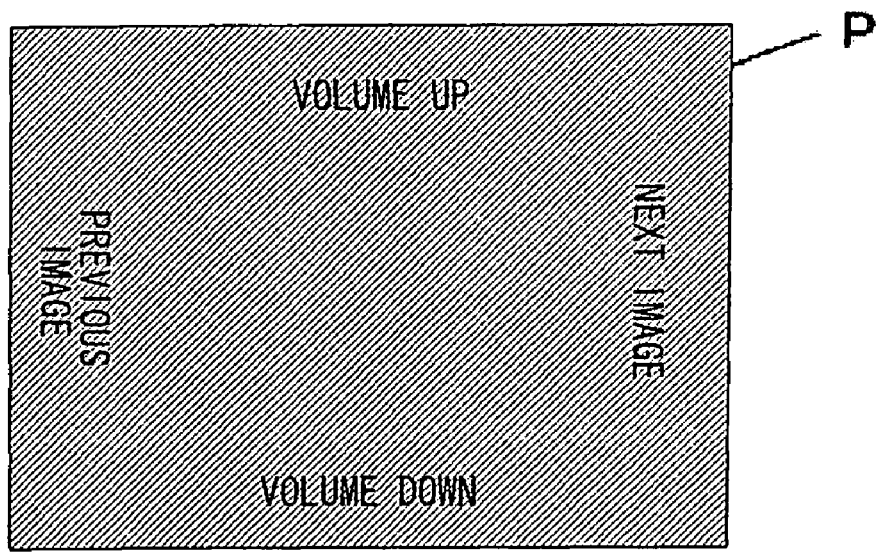
FIG. 10 is a figure for explanation of an example of projection of command information in a fourth embodiment.

FIG. 10 is a figure for explanation of an example of such projection of command information in this fourth embodiment. In FIG. 10, command information (text in this example) is overlay projected upon a projection image according to the method of any one of the first embodiment through the third embodiment. If "replay image" is set as the projection contents, then the CPU 101 transmits contents data corresponding to the "replay image" and text data indicating commands to the liquid crystal drive unit 65, and overlay projects the command information superimposed upon the contents image. In FIG. 10, respectively, the command information "sound volume up" is overlaid upon the upper portion of the projection range P, the command information "sound volume down" is overlaid upon the lower portion of the projection range P, the command information "previous image" is overlaid upon the left portion of the projection range P, and the command information "next image" is overlaid upon the right portion of the projection range P.

This command projection is performed if, for any one of the four extracted blocks, as described below, the image signal has changed for greater than or equal to a predetermined time period (for example 0.1 seconds). When the image change detection circuit 208 detects that the disparity between the image signal which constitutes the newest frame image and the image signal which constitutes the previous frame image is greater than a predetermined value, then it checks whether this state has continued for greater than or equal to 0.1 seconds. If the image change detection circuit 208 has decided that, for some detected block, the change in the image signal continues for at least one frame thereafter (in other words if, for that block, a hand is photographed continuously for at least 0.1 seconds), then it decides that a request has been made for command projection, and sends a command projection request signal to the imaging unit control CPU 203. This command projection request signal is passed through the imaging unit control CPU 203 to the CPU 101. According to this command projection request signal, the CPU 101 sends, to the liquid crystal drive unit 65, text data which specifies commands according to the projection contents which are set at this time point. Due to this, command projection from the projector module 6 is started, and the system operates in the command detect mode.

Taking as an example the case of this command projection in combination with the first embodiment, among the regions from the range C of photography by the imaging unit 200 excluding the range P of projection by the projector module 6, the four extracted blocks consisting of the block UC which is positioned at the upper portion of the projection range (FIG. 4), the block DC which is positioned at the lower portion of the projection range (FIG. 4), the block LC which is positioned at the left portion of the projection range (FIG. 4), and the block RC which is positioned at the right portion of the projection range (FIG. 4), are the spaces which are used for command input. During a presentation, by the operator putting his hand temporarily into the space which corresponds to any one of these four blocks, command information which corresponds to the extracted blocks is projected in the projection range P, in positions close to the respective blocks.

In the state in which command projection as shown by way of example in FIG. 10 is being performed, the image change detection circuit 208 may decide upon the presence or absence of command input related to the four blocks described above by any one of the methods of the first embodiment through the third embodiment described above. The operation is the same as in the first through the third embodiments when the presence or absence of command input has been decided upon, and accordingly explanation thereof will be omitted.

On the other hand, when a predetermined time period (for example about 8 seconds) elapses from when the command projection request signal is received, the CPU 101 sends a command to the liquid crystal drive unit 65 so as to terminate the overlay projection of the commands and so as to return to the normal projection state in which only the contents image is projected, and the command detect mode is terminated. Moreover, it would be acceptable to provide the above described display of commands as superimposed upon the display of the projection contents; or it would also be acceptable only to provide the above described display of commands without displaying the contents which are to be projected.

The fourth embodiment explained above will now be summarized.

(1) When, during a presentation, the operator puts his hand or the like into a space which corresponds to any one of the four spaces for command input (the extracted blocks) for greater than or equal to the predetermined time period (in the example described above 0.1 seconds), then the electronic camera with projector 50 projects the respective command information into positions in the projection range P which are close to the extracted blocks. By doing this, the operator is able to perform actuation without referring to any actuation manual, even if he has forgotten the control details of the various commands. It is to be noted that, if this command projection is performed in combination with the second embodiment or the third embodiment, then, since it is possible to perform the overlay projection of the command information in the positions of the extracted blocks rather than in positions which are close to the extracted blocks, it is possible to project the correspondence relationship between the extracted blocks and the control contents in a more understandable manner.

(2) Since the command information is projected as an overlay which is superimposed upon the contents image, it is acceptable not to interrupt the projection of the contents image.

(3) The convenience of use for the operator is excellent since the projection of the commands is automatically ended when the predetermined time period (8 seconds in the example describe above) elapses with the command information being projected.

Variant Embodiment 7

Figure 11:
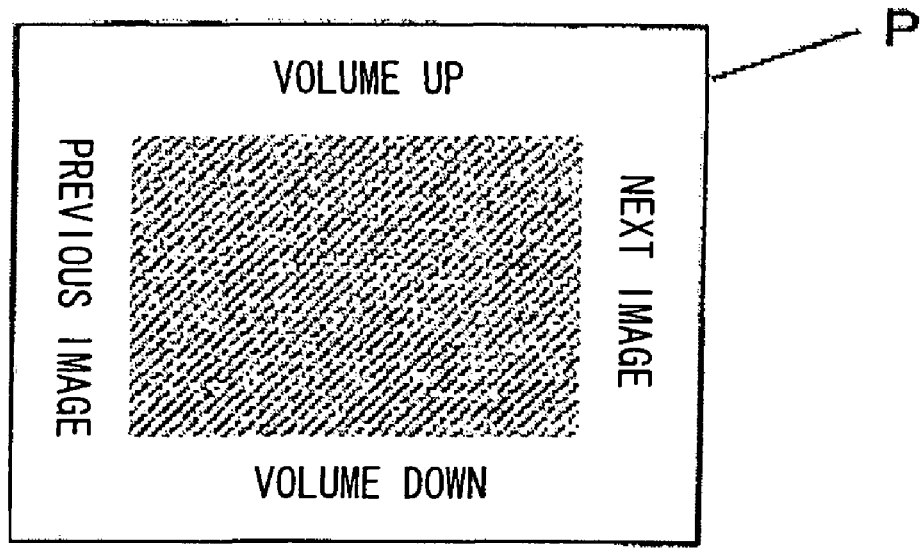
FIG. 11 is a figure for explanation of a variant example of projection of command information.

FIG. 11 is a figure for explanation of another example of projection of command information according to the fourth embodiment. In FIG. 11, a projection image and command information according to any one of the first embodiment through the third embodiment are projected. In the same manner as in the case of FIG. 10, when the projection contents is set to "replay image", the CPU 101 transmits the contents data and the commands corresponding to "replay image" to the liquid crystal drive unit 65, and projects the contents image along with the command information. According to FIG. 11, the contents image is projected as shrunk down as compared with the size of the projection range P, and the command information is projected in the neighborhood of the border of this shrunk down contents image. In other words, the command information "volume up" is projected in the upper portion of the contents image, the command information "volume down" is projected in the lower portion of the contents image, the command information "previous image" is projected in the left portion of the contents image, and the command information "next image" is projected in the right portion of the contents image.

According to the above described variant embodiment 7, since it is arranged to project the contents image as shrunk down as compared with the size of the projection range P, and to project the command information in the neighborhood of the border of this shrunk down contents image, it is acceptable not to interrupt the projection of the contents image. Moreover, since the contents image and the text information are not overlapped, the command information (text or the like) is not made more difficult to see, due to the color or the pattern of the contents image.

Variant Embodiment 8

Figure 12:
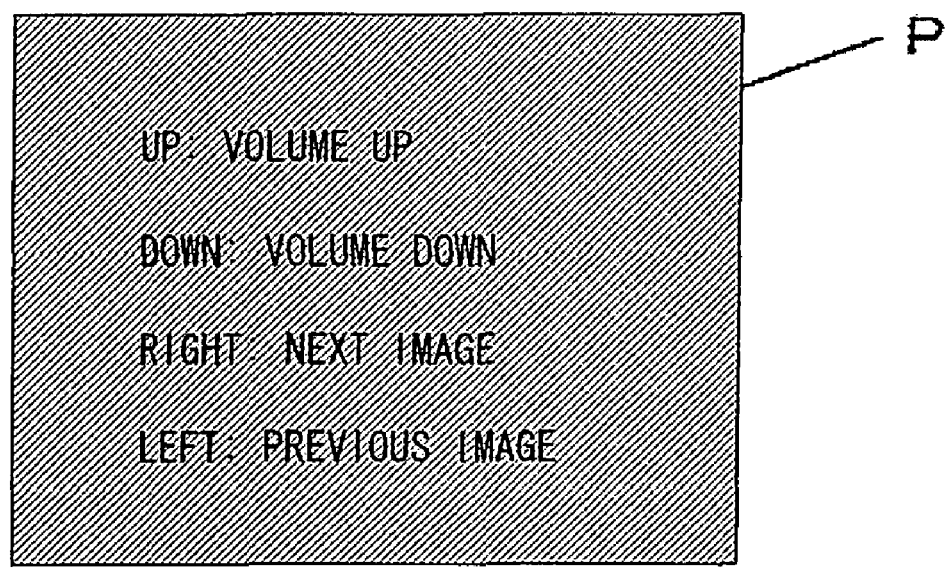
FIG. 12 is a figure for explanation of a variant example of projection of command information.

FIG. 12 is a figure for explanation of yet another example of projection of command information according to the fourth embodiment. In FIG. 12, a projection image and command information according to any one of the first embodiment through the third embodiment are projected. In the same manner as in the case of FIG. 10 or FIG. 11, if the projection contents is set to "replay image", then the CPU 101 transmits the contents data and the commands corresponding to "replay image" to the liquid crystal drive unit 65, and projects the command information overlaid upon the contents image. According to FIG. 12, a list of the command information corresponding to the extracted blocks is projected in the center of the projection range P.

Since, according to the above described Variant Embodiment 8, it is arranged to project a list of the command information as overlaid upon the contents image, it is acceptable not to interrupt the projection of the contents image. Furthermore, since the text information is all projected together in the center, the operator is able to confirm all of the command information, even without surveying all over the entire area of the projection range P.

Variant Embodiment 9

It would also be acceptable to arrange for the command information to be displayed as overlapped over the monitor image which is being displayed upon the display device 115 explained with reference to Variant Embodiment 6. The CPU 101 of the electronic camera with projector 50 displays the command information corresponding to the detected blocks UCf, DCf, RCf and LCf shown in FIG. 9 as overlaid in the position of each of the detected blocks. While watching the monitor image upon the liquid crystal display device 115, the operator puts his hand in front of the photographic lens 51, and moves his hand so that his hand is displayed as overlaid with the command information which is being overlay displayed upon the liquid crystal display device 115. By doing this, the operator is able to perform actuation without referring to any actuation manual, even if he has forgotten the control details of the various commands.

Variant Embodiment 10

During a presentation, the presenter (the operator) sometimes may point at the screen using an external device such as a fescue or a laser pointer or the like. At this time, suppose that the image of the fescue or the pointer undesirably encroaches upon one of the detection blocks described above. In this type of case, it is desirable for the CPU 101 to be so adapted as not to decide upon command input, even if change of the image or change of the focus in the detection block is detected. A structure for implementing this function will now be explained.

An actuation member is provided to the external device such as a fescue or a laser pointer or the like, and is actuated when indicating the projection image upon the screen therewith and making a presentation (i.e. during use thereof), and, when this actuation member is actuated, an external signal which shows that the fescue or laser pointer is being used is transmitted to the electronic camera with incorporated projector. Particularly, in the case of a laser pointer, a structure may be employed in which the switch to set the laser in the state in which the laser is emitting light also serves as the actuation member which is actuated during use, as described above. In this case, the external signal is always being transmitted to the electronic camera with incorporated projector during the state in which the laser is emitting light. It is desirable for the method of transmitting the above described external signal to be wireless.

The CPU 101 of the electronic camera with incorporated projector receives the external signal via its external interface 108. Upon receipt of this external signal in the command detect mode, the CPU 101 decides whether, even though it has detected change of the image or change of the focus state in the detected block(s), these changes are not effective, in which case it does not perform output of any control signal based upon that change. This type of structure may also be applied to any of the embodiments or variant embodiments described above. By providing this type of structure in which it is possible to consider command input by the external device as being ineffective, it is ensured that, even during use of the fescue or the laser pointer, an erroneous command cannot be executed, which would be undesirable. Furthermore, it would also be possible to apply the structure described above to a case such as one in which it is desired temporarily to interrupt the input of commands by hand as described above, or the like, according to the independent decision of the operator himself.

In the above explanation of various embodiments and variant embodiments, it was arranged to provide the positions of the detected blocks at four predetermined regions which were positioned at the top, the bottom, the left and the right of the imaging range C (the projection range P). Instead of this, it would also be acceptable to provide them at four predetermined regions which are provided at the four corners of the imaging range C (the projection range P). In this case, commands would be issued respectively corresponding to these four predetermined regions which are positioned at these four corners.

Even further, it would also be acceptable for the positions of the detected blocks to be provided at four predetermined regions which were positioned at the top, the bottom, the left, and the right of the imaging range C (the projection range P), and also at four predetermined regions which are provided at the four corners of the imaging range C (the projection range P).

It would also be acceptable for the positions of the detected blocks to be different, according to the projection contents which are set. For example, it would also be acceptable, with "image replay", for the detected blocks at the predetermined regions which are positioned at the top and the bottom of the imaging range C (the projection range P) to be omitted. In this case, even if the operator puts his hand into the upper portion or the lower portion of the imaging range C (the projection range P), this is not decided as meaning that command input actuation has been performed.

The above described frame rate of 10 frames/second, and the 10 frames during fast forward and fast reverse, are only examples: it would also be acceptable to make the frame rate be 30 frames/second, and to perform fast forward and fast reverse in units of 20 frames.

Although, as an example of the projector module 6, the case has been explained in which the optical image formation element was built using the liquid crystal panel 62, and an optical image was obtained by illuminating the image created by the liquid crystal panel 62 with light from the LED light source 63, it would also be acceptable to arrange to build the projector module using an optical image formation element which itself emits light. In this case, the optical image formation element is an optical image formation element in which a number of light sources corresponding to the number of image elements are arranged in an array, and it creates an optical image by emitting light for each image element of a luminance which corresponds to the image signal. Furthermore, it would also be acceptable to build a projector module in which compact mirrors are arranged in a two dimensional array, and which performs spatial light modulation by rotationally driving each mirror.

Although, in the above description, by way of example, the case has been explained in which the projector module 6 is mounted to an electronic camera 50, it would also be acceptable for it to be mounted to an electronic device such as a notebook type personal computer, a PDA, a portable telephone device, a relay device or the like.

Although the details of various embodiments have been explained in the above description, the present invention is not to be considered as being limited by the contents thereof. Other modes which are considered to lie within the range of the technical concept of the present invention are also included within its scope.

The disclosure of the following priority application is herein incorporated by reference:
Japanese Patent Application No. 2004-292391 filed Oct. 5, 2004.

What is claimed is:

1. An electronic device, comprising:
a projector device that projects an image formed by an optical image formation element with a projection range;
an imaging device that captures an image with an imaging range so that the imaging range captured by the imaging device includes the projection range projected by the projector device and the imaging range is wider than the projection range, and outputs an image signal;
an image change detection unit that detects change of the image signal in a plurality of regions in a range that is determined by excluding the projection range from the imaging range captured by the imaging device and located outside of the projection range where no image is projected by the projector device;
a command unit that issues a different command for each of the plurality of regions in which changes are detected by the image change detection unit according to the region within the imaging range in which change has been detected by the image change detection unit, wherein each of the commands is related to operation of the projector device or an external device that is electrically connected to the electronic device; and
a reception unit that receives an external signal outputted by the external device that is electrically connected to the electronic device, wherein:
the command unit decides that the command according to change of the image signal is valid when the external signal is not being received via the reception unit and the command according to change of the image signal is invalid when the external signal is being received via the reception unit, in case that the change of the image signal has been detected by the image change detection unit.

2. An electronic device according to claim 1, wherein:
the image change detection unit detects change of the image signal in a plurality of predetermined regions which are provided at an upper, a lower, a left and a right portion within the imaging range and predetermined regions which are positioned in four corner portions of the imaging range; and
the command unit issues the command which is determined in advance for each of the predetermined regions.

3. An electronic device according to claim 2, wherein:
the command unit issues the command if the change of the image signal detected by the image change detection unit has continued for a predetermined time period.

4. An electronic device according to claim 2, wherein;
the image change detection unit varies a position of the region for detection of change of the image signal according to contents being projected by the projector device.

5. An electronic device according to claim 2, wherein;
the command unit varies the command according to contents being projected by the projector device when change of the image signal has been detected by the image change detection unit in the same predetermined region.

6. An electronic device according to claim 1, further comprising:
a control unit that causes the projector device to project information which indicates a correspondence between the command by the command unit and a position of a region in which change is detected by the image change detection unit.

7. An electronic device according to claim 1, further comprising:
a display device that displays information which indicates a correspondence between the command by the command unit and a position of a region in which change is detected by the image change detection unit.

8. An electronic device, comprising:
an imaging device that captures an image, and outputs an image signal;
a projector device that projects an image formed by an optical image formation element;
a focus evaluation information calculation unit that calculates focus evaluation information indicating an extent to which the image captured by the imaging device is in focus, based upon the image signal by using one of a contrast method for auto focus operation and a phase difference method for auto focus operation;
a focus evaluation information change detection unit that detects change of the focus evaluation information calculated by the focus evaluation information calculation unit; and
a command unit that issues a command related to operation of the projector device according to a region in which change of the focus evaluation information has been detected within an imaging range captured by the imaging device.

9. An electronic device according to claim 8, wherein:
the imaging range captured by the imaging device is one of range approximately equal to a projection range projected by the projection device and range which includes the projection range.

10. An electronic device according to claim 8, wherein:
the focus evaluation information calculation unit calculates the focus evaluation information in at least one of predetermined regions which are positioned at the upper, lower, left and right portions within the imaging range and predetermined regions which are positioned at the four corner portions of the imaging range; and
the command unit issues the command which is determined in advance for each predetermined region.

11. An electronic device according to claim 10, wherein:
the command unit issues the command if the change of the focus evaluation information which has been detected by the focus evaluation information change detection unit has continued for a predetermined time period.

12. An electronic device according to claim 10, wherein:
the focus evaluation information calculation unit varies a position of a region in which the focus evaluation information is calculated according to contents being projected by the projector device.

13. An electronic device according to claim 10, wherein:
the command unit varies the command to be issued according to contents being projected by the projector device when change of the focus evaluation information has been detected by the focus evaluation information change detection unit in the same predetermined region.

14. An electronic device according to claim 8, further comprising:
a control unit that causes the projector device to project information indicating a correspondence between the command by the command unit and a position of the region in which change is detected by the focus evaluation information change detection unit.

15. An electronic device according to claim 8, further comprising:
a display device that displays information indicating a correspondence between the command by the command unit and a position of the region in which change is detected by the focus evaluation information change detection unit.

16. An electronic device, comprising:
a projector device that projects an image formed by an optical image formation element;
an imaging device that captures an image of an object to be photographed, and outputs an image signal;
an image change detection unit that detects change of the image signal outputted from the imaging device;
a focus evaluation information acquisition unit that acquires focus evaluation information indicating an extent to which the image of the object captured by the imaging device is in focus, by using one of a contrast method for auto focus operation and a phase difference method for auto focus operation;
a focus evaluation information change detection unit that detects change of the focus evaluation information acquired by the focus evaluation information acquisition unit;
a first command unit that issues a command related to operation of the projector device based upon change of the image signal;
a second command unit that issues a command related to the operation of the projector device based upon change of the focus evaluation information; and
a control unit that controls the first command unit and the second command unit to issue the command from one of the first command unit and the second command unit according to contents being projected by the projector device.

17. An electronic device according to claim 3, wherein;
the image change detection unit varies a position of the region for detection of change of the image signal according to contents being projected by the projector device.

18. An electronic device according to claim 3, wherein;
the command unit varies the command according to contents being projected by the projector device when change of the image signal has been detected by the image change detection unit in the same predetermined region.

19. An electronic device according to claim 11, wherein:
the focus evaluation information calculation unit varies a position of a region in which the focus evaluation information is calculated according to contents being projected by the projector device.

20. An electronic device according to claim 11, wherein:
the command unit varies the command to be issued according to contents being projected by the projector device when change of the focus evaluation information has been detected by the focus evaluation information change detection unit in the same predetermined region.

21. An electronic device according to claim 16, wherein:
the control unit controls the first command unit to issue the command from the first command unit in case that the contents being projected by the projector device is a still image and controls the second command unit to issue the command from the second command unit in case that the contents being projected by the projector device are a moving image.

* * * * *